(12) United States Patent
Lucente et al.

(10) Patent No.: US 11,435,230 B2
(45) Date of Patent: Sep. 6, 2022

(54) METHODS FOR SPECTRAL MAPPING

(71) Applicant: Nanohmics, Inc., Austin, TX (US)

(72) Inventors: Mark E. Lucente, Austin, TX (US);
Chris W. Mann, Austin, TX (US)

(73) Assignee: Nanohmics, Inc., Austin, TX (US)

( * ) Notice: Subject to any disclaimer, the term of this patent is extended or adjusted under 35 U.S.C. 154(b) by 0 days.

(21) Appl. No.: 17/210,913

(22) Filed: Mar. 24, 2021

(65) Prior Publication Data

US 2022/0099491 A1     Mar. 31, 2022

Related U.S. Application Data

(60) Provisional application No. 63/000,804, filed on Mar. 27, 2020.

(51) Int. Cl.
*G01J 3/28*     (2006.01)
*G01J 3/02*     (2006.01)
*G01J 3/12*     (2006.01)

(52) U.S. Cl.
CPC .......... *G01J 3/2823* (2013.01); *G01J 3/0227* (2013.01); *G01J 2003/1247* (2013.01)

(58) Field of Classification Search
CPC ....... G01J 2003/1247; G01J 2003/2826; G01J 3/2823; G01J 3/0227
See application file for complete search history.

(56) References Cited

U.S. PATENT DOCUMENTS

| 5,212,584 | A | 5/1993 | Chung |
| 7,095,027 | B1 | 8/2006 | Boreman et al. |
| 7,557,918 | B1 | 7/2009 | Newman et al. |
| 7,956,793 | B2 | 6/2011 | Puscasu et al. |
| 7,973,696 | B2 | 7/2011 | Puscasu et al. |
| 8,013,690 | B2 | 9/2011 | Miyashiro |
| 8,750,653 | B1 | 6/2014 | Peters et al. |

(Continued)

FOREIGN PATENT DOCUMENTS

WO     2011050272 A2     4/2011

OTHER PUBLICATIONS

Taun Vo-Dinh, "A Hyperspectral Imaging System for In Vivo Optical Diagnostics", 2004 (Year: 2004).*

(Continued)

*Primary Examiner* — Maurice C Smith
(74) *Attorney, Agent, or Firm* — Murphy Strategic IP; George L. Murphy

(57) ABSTRACT

Methods use a tunable notch filter for constructing a spectral map of electromagnetic radiation in a selected spectral band that is incident on a notch filter for a plurality of time periods. Electromagnetic radiation is passed by an electronically tuned notch filter to a detector array for the plurality of selected time periods, and the detector response is determined. For at least a first selected time period the notch filter is tuned to selectively attenuate the passing of one or more selected sub-bands of electromagnetic radiation in the selected spectral band. Information about the selectively attenuated radiation is determined and used along with information about the radiation passed to the detector array for each time period to construct a spectral map. Electronically tunable notch filters may be made with metamaterials such as patterned graphene.

24 Claims, 15 Drawing Sheets

(56) References Cited

U.S. PATENT DOCUMENTS

| | | | |
|---|---|---|---|
| 9,040,913 B2 | 5/2015 | Savoy et al. | |
| 9,160,060 B2 | 10/2015 | Yosui et al. | |
| 9,202,945 B2 | 12/2015 | Colli et al. | |
| 9,214,973 B1 | 12/2015 | Venkatesh et al. | |
| 9,423,301 B2 | 8/2016 | Savoy et al. | |
| 9,595,935 B2 | 3/2017 | Kavousian et al. | |
| 9,712,196 B2 | 7/2017 | Ripley et al. | |
| 9,786,405 B2 | 10/2017 | Afzali-Ardakani et al. | |
| 10,072,970 B1 | 9/2018 | Twede et al. | |
| 10,074,899 B2 | 9/2018 | Wu et al. | |
| 10,084,102 B2 | 9/2018 | Cai et al. | |
| 10,136,077 B1 | 11/2018 | Twede et al. | |
| 10,252,914 B2 | 4/2019 | Arnold et al. | |
| 10,297,752 B2 | 5/2019 | Mann et al. | |
| 2012/0019923 A1 | 1/2012 | Niesten | |
| 2012/0302188 A1 | 11/2012 | Sahota et al. | |
| 2013/0153767 A1 | 6/2013 | Savoy et al. | |
| 2015/0377703 A1 | 12/2015 | Savoy et al. | |
| 2018/0040820 A1 | 2/2018 | Mann et al. | |
| 2018/0106933 A1 | 4/2018 | Chanda et al. | |
| 2018/0149943 A9 | 5/2018 | Puscasu | |
| 2018/0184015 A1 | 6/2018 | Richarte et al. | |
| 2018/0340837 A1 | 11/2018 | Safai | |
| 2019/0171001 A1 | 6/2019 | Jin et al. | |
| 2019/0364254 A1 | 11/2019 | Ortiz Egea et al. | |
| 2020/0049891 A1 | 2/2020 | Menard et al. | |
| 2020/0084407 A1 | 3/2020 | Sargent et al. | |
| 2020/0084775 A1 | 3/2020 | Abdelmonem et al. | |
| 2020/0370960 A1* | 11/2020 | Barak | G01J 3/0208 |

OTHER PUBLICATIONS

B.J. Jackel, "Auroral spectral estimation with wide-band color mosaic CCDs", 2014 (Year: 2014).*
Yuske Monno, "Single-Sensor RGB-NIR Imaging: High-Quality System Design and Prototype Implementation", 2019 (Year: 2019).*
Abadi, S. et al., "MAcro-Electro-Mechanical Systems (MÆMS) based concept for microwave beam steering in reflectarray antennas", J Appl Phys, vol. 120: Article ID 054901, pp. 1-8 (Aug. 5, 2016).
Balanis, C.A., 2016, "Antenna Theory Analysis and Design", John Wiley and Sons, Inc. Hoboken New Jersey, 4th ed., pp. 798-811.
Bordoloi, A.K. et al., 2011 "A novel approach for post fabrication fine tuning and matching of microstrip patch antenna using adjustable air pocket in substrate layer", 2011 Loughborough Antennas & Propagation Conference, IEEE 2011, pp. 1-3, doi: 10.1109/LAPC.2011.6114026. (Nov. 14-15, 2011).
Chen, H-T. et al., "A review of metasurfaces: physics and applications", Rep Prog. Phys. vol. 79: 076401 (Jun. 16, 2016).
Costa, F. et al., "Closed-form analysis of reflection losses in microstrip reflectarray antennas", IEEE Transactions on Antennas and Propagation, vol. 60: No. 10 pp. 4650-4660 (Oct. 2012).
Costa, F. et al., "Electromagnetic absorbers based on high-impedance surfaces: from ultra-narrowband to ultra-wideband absorption", Adv Electromagnetics, vol. 1: No. 3 pp. 7-12 (Oct. 2012).
Cui, Y. et al., "Plasmonic and metamaterial structures as electromagnetic absorbers", Laser Photonics Rev., vol. 8 No. 4 pp. 495-520 (2014).
Fang, Z. et al., "Active Tunable Absorption Enhancement with Graphene Nanodisk Arrays", Nano Lett. vol. 14: pp. 299-304 (Dec. 9, 2013).
Gupta, N., "Hyperspectral imager development at Army Research Laboratory", Infrared Technology and Applications XXXIV, B. Andresen, G. Fulop, P. Norton (eds.), Proc. of SPIE vol. 6940: 69401P-10 (2008).
Gupta N. et al., "Performance characterization of tunable longwave infrared notch filters using quantum cascade asers," Opt. Eng. vol. 57: No. 12 p. 127101 (Dec. 2018).
Gupta, N. et al., "Development of Longwave Infrared Tunable Notch Filters", Abstract Conference on Lasers and Electro-Optics (CLEO), San Jose, CA, USA, IEEE Xplore (Jul. 1, 2019).
Huang, X. et al., "Graphene based tunable fractal Hilbert curve array broadband radar absorbing screen for radar cross section reduction", AIP Advances vol. 4: 117103 (Nov. 3, 2014).
Huang, H. et al., "Design of broadband graphene metamaterial absorbers for permittivity sensing at mid-infrared regions", Scientific Reports vol. 8: 4183 (Mar. 8, 2018).
Jackson Jr, R et al., "A MEMS-based electrostatically tunable circular microstrip patch antenna", J Micromech. Microeng., vol. 17 (2007) pp. 1-8 (Nov. 21, 2006).
Khromova, I. et al., "Tunable Multilayer Graphene Metamaterials for Terahertz/Infrared Waveguide Modulators", Abstract Progress In Electromagnetics Research Symposium, Prag, Czech Republic (2015).
Landy, N. et al., "A Perfect Metamaterial Absorber", Phys. Rev. Lett., vol. 100 (2011) 207402 (May 21, 2008).
Liu, C. et al., "Broadband graphene-based metamaterial absorbers", AIP Advances vol. 8: 015301 (Jan. 3, 2018).
Mao, H. et al., "MEMS-Based Tunable Fabry-Perot Filters for Adaptive Multispectral Thermal Imagi", Journal of Microelectromechanical Systems, vol. 25: No. 1 (Feb. 2016).
Milne, J. et al., "Widely Tunable MEMS-Based Fabry-Perot Filter", Journal of Microelectromechanical Systems, vol. 18: No. 4, pp. 905-9813 (Aug. 2009).
Park, J. et al., "Electrically Tunable Epsilon-NearZero (ENZ) Metafilm Absorbers", Scientific Reports vol. 5: 15754 (Nov. 9, 2015).
Rahmanzadeh, M. et al., "Multilayer graphene-based metasurfaces: Robust design method for extremely broadband, wide-angle and polarization-insensitive terahertz absorbers", Applied Optics, vol. 57: No. 4, pp. 959-968 (Jan. 2, 2018).
Rasti, B. et al., "Noise Reduction in Hyperspectral Imagery: Overview and Application", Remote Sens. vol. 3: 482 (Mar. 20, 2018).
Raz A. et al., "Sequential filtering for color image acquisition", Optics Express, vol. 22: No. 22 (Oct. 22, 2014).
Sun J. et al., "An extremely broad band metamaterial absorber based on destructive interference", Optics Express, vol. 19: No. 22 pp. 21155-21162 (Oct. 24, 2011).
Tack, N. et al., "A Compact, High-speed and Low-cost Hyperspectral Imager", Proc. of SPIE, vol. 8266: 82660Q-1 (2008).
Thongrattanasiri, S. et al., "Total light absorption in graphene", Physical Review Letters, vol. 108: 047401 (2012).
Tung, B.S. et al., "Polarization-independent, wide-incident-angle and dual-band perfect absorption, based on near-field coupling in a symmetric metamaterial". Scientific Reports, vol. 7:11507 pp. 1-7 (Sep. 14, 2017).
Turpin, J. et al., "Reconfigurable and Tunable Metamaterials: A Review of the Theory and Applications", International Journal of Antennas and Propagation, vol. 2014: Article ID 429837, pp. 1-18 (May 22, 2014).
Wu, C. et al., "Ultra-thin, wide-angle perfect absorber for infrared frequencies", Proc. of SPIE, vol. 7029, 7029W 1-5 (2008).
Wu, C. et al., "Large-area wide-angle spectrally selective plasmonic absorber", Phys. Rev. B, vol. 84: 075102 1-7 (2011).
Ye, L. et al., "Electrically Tunable Broadband Terahertz Absorption with Hybrid-Patterned Graphene Metasurfaces", Nanomaterials, vol. 8: p. 562 (Jul. 24, 2018).
Yue, W. et al., "High performance infrared plasmonic metamaterial absorbers and their applications to thin-film sensing", Plasmonics ,vol. 11:1557-1563 (Apr. 7, 2016).
Zhou, C. et al., "Tunable Fano resonator using multilayer graphene in the near-infrared region", Apppl. Phys. Lett., vol. 112: 101904 pp. 1-5 (Mar. 8, 2018).
Zhou, Q. et al., "Graphene based controllable broadband terahertz metamaterial absorber with transmission band", Materials, vol. 11 2409 pp. 1-8 (Nov. 29, 2018).

* cited by examiner

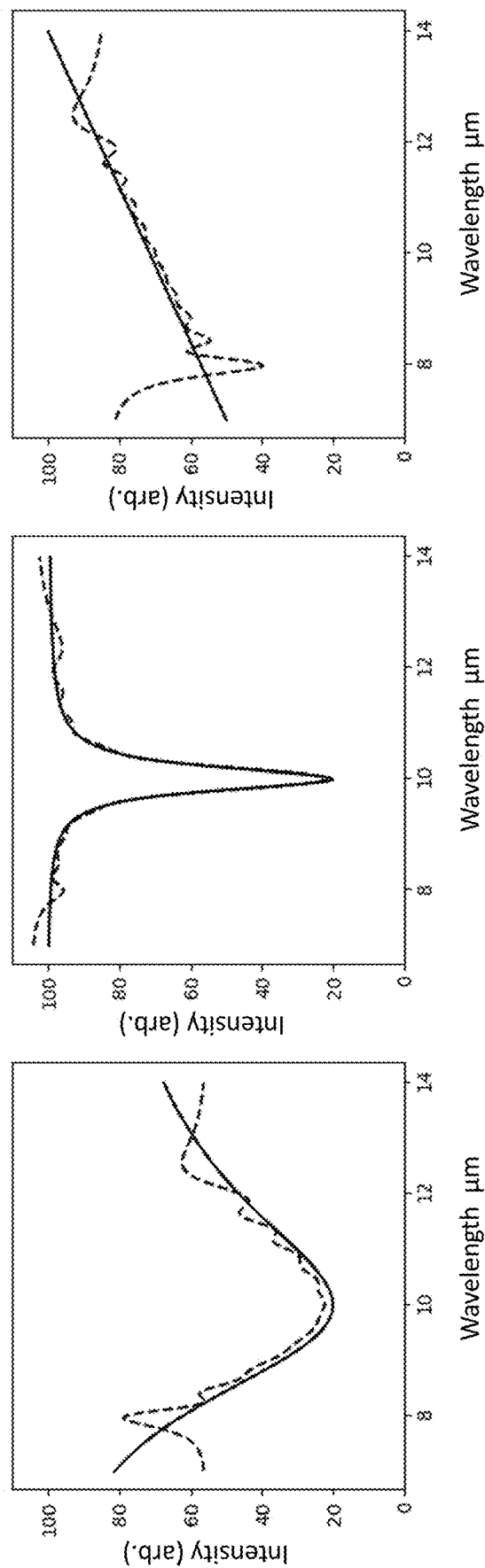

METHODS FOR SPECTRAL MAPPING

CROSS-REFERENCE TO RELATED APPLICATIONS

This application claims the benefit of U.S. Provisional Patent Application No. 63/000,804, filed Mar. 27, 2020, which is incorporated by reference herein in its entirety.

STATEMENT REGARDING FEDERALLY SPONSORED RESEARCH

The invention was made, in part, with government support under Contract No. W911QX-18-C-0002 awarded by the U.S. Army and Contract No. M67854-19-P-6617 awarded by the U.S. Navy. The government has certain rights in the invention.

FIELD OF THE INVENTION

This invention is related to mapping spectrometers and methods for their use in separating, identifying, and imaging spectral, spatial, and polarization components of radiation and in constructing spectral maps.

GENERAL DESCRIPTION

Spectrometers are used for gathering electromagnetic radiation from a scene, and typically operate by separating the spectral components of the gathered radiation into individual wavelengths or narrow spectral bands and directing the spectral components to a detector, which detects and measures the spectrally separated radiation and converts the resulting spectral information to electrical signals that are representative of the spectral composition of the radiation. Mapping spectrometers, including multispectral and hyperspectral imagers, associate these spectra with a position on a spatial or angular map. Multispectral and hyperspectral detection and imaging have applications in a broad array of fields such as satellite surveillance, planetary science, medicine, and environmental monitoring. Hyperspectral imagers and associated methods of analysis are also useful for tracking and detecting chemical or physical markers. In manufacturing, spectral imaging is employed for quality assurance purposes, for example, the verification that spectral markers in a product or component meet specific parameters.

Many currently available spectral imaging systems require numerous optical components, complex spectroscopic instrumentation, and precision alignment, and are large, heavy, and expensive. Many hyperspectral imaging systems utilize spatial scanning, i.e., scanning wide, thin swaths of a scene in a single spectral image frame, which requires motion such as the rastering of a mirror or movement of an airplane or satellite across a region of landscape or a planet for capturing the image swaths. An entire spectral image or scene can be assembled and processed only after all the swaths have been captured.

One alternative to spatial scanning is spectral scanning, such as with etalon-based hyperspectral imagers, which are typically complex and have limited spectral band resolution or spectral grasp. Spectrometers that use for example tunable bandpass filters filter most of the incident radiation, resulting in undesirable tradeoffs including weak signals at the radiation detector, large collection optics, concomitant long integration times, and spectral maps with low signal-to-noise ratios. They can also inadvertently pass higher-order light, introduce spatial-spectral artifacts in moving scenes, and have angular acceptance problems.

Spectrometers that use superpixel detector configurations or spectral filter arrays, including fixed notch filter mosaics, are known to sacrifice spatial resolution (i.e., the number of spatial samples in a spectral map) in order to enhance spectral resolution. Some spectrometers that use subpixel filter arrays can have misalignments among the spectral components due to inherent spectral filter structure, resulting in data misalignment. Some spectral imagers may require costly, irreversible integration between the focal plane array sensor and spectral filters. In addition, superpixel configurations are typically integrated with the sensor and therefore are not capable of broadband operation and cannot revert back to a panchromatic mode. In such situations, where both spectral and non-spectral maps are needed from the same instrument, a separate image sensor is required to acquire the broadband non-spectral maps. This can increase complexity and typically requires either moving parts or sharing the light between multiple sensors, reducing throughput.

SUMMARY

Embodiments described herein provide solutions to numerous problems encountered with the use of other systems for constructing spectral maps. By way of example, in other systems a spectral filter array such as a color filter array or bandpass filter array may be used to pass only radiation that is within a selected spectral band or bands of interest, such as for example red light, green light, or yellow light. That is, only specific and often narrow bands of radiation (red light, green light, yellow light) pass through the bandpass filter array to pixels on a detector array, the selected pixels being determined by the placement of each color filter in the filter array. Information about radiation received at a detector array can be used to construct spectral and spatial maps of, for example, a scene. However, because these types of imagers filter out most incident radiation, preventing its detection by the detector array, these types of spectral mapping systems suffer from weak responses at the detector array, concomitant lengthy integration times, and spectral maps with low signal-to-noise ratios relative to the available light. Scene construction with such imagers is based only on the radiation that is received by the detector array. Spectral information about the unpassed (filtered out) radiation is not determined and therefore cannot be used for spectral mapping.

With the methods described herein a tunable notch filter-based mapping spectrometer can be used to pass most electromagnetic radiation (EMR) that is incident on the tunable notch filter to a detector array, resulting in higher signal-to-noise ratios. In some aspects, passing to a detector array of one or more than one sub-bands in a selected spectral band of the electromagnetic spectrum that is being analyzed, is attenuated. According to embodiments described herein, spectral intensity information, spatial information, and polarimetric information about the EMR whose passing to the detector array is attenuated can be determined and the resulting information can be used in constructing a spectral map of EMR that is incident on the notch filter and that is in the selected spectral band.

Embodiments described herein include methods for analyzing EMR using a tunable notch filter and a controller for electronically tuning the notch filter. In some aspects a method comprises, for a plurality of selected time periods, passing EMR from an electronically tuned notch filter to a detector array, the EMR being incident on the notch filter and in a selected spectral band, wherein the notch filter is tuned differently for each of the plurality of selected time periods and the EMR is passed by the notch filter; for at least a first selected time period in the plurality of selected time periods, selectively attenuating the passing of EMR that is incident on the notch filter and in a first set of one or more than one sub-bands in the selected spectral band; for each of the plurality of selected time periods, determining an electrical response of the detector array to the passed EMR and receiving at a data processor a data array representative of the determined electrical response of the detector array to the passed EMR; computationally comparing two or more of the received data arrays, the two or more compared data arrays including the data array representative of the determined electrical response of the detector array to the EMR passed for the first selected time period; determining from the two or more compared data arrays, spectral intensity information and spatial information about the EMR that is incident on the notch filter and in the first set of one or more than one sub-bands; and using the received data arrays for each of the plurality of selected time periods and the determined information about the EMR that is incident on the notch filter and in the first set of one or more than one sub-bands, constructing a spectral map of EMR in the selected spectral band that is incident on the notch filter for the plurality of selected time periods.

Embodiments of methods described herein are useful in numerous applications including for example scene imaging, satellite imaging, identification of remote objects, analysis of chemical and physical markers in a variety of settings, and medical imaging. Additional applications include chemical analysis of emissions, detection of improvised explosive devices, and protection from directed-energy weapons that target personnel, missiles, vehicles, and optical devices. Methods are also useful for multispectral infrared (IR) hyperspectral imaging to provide for visualization of images through obscurants such as smoke, dust, and camouflage and can be used for nighttime automated passive detection and identification of objects over large scene areas.

Some embodiments described herein address the problem of reduced spatial resolution by using temporal scanning of a scene with a tunable notch filter, such that a spectral map of a scene can have a full pixel count that matches pixels on, for example, a focal plane array detector. Incorporating a tunable notch filter in a mapping spectrometer enables the passing to a detector array of a larger amount of the EMR that is incident on the notch filter than can be achieved with a bandpass filter arrangement, thereby resulting in a spectral map having a much higher signal-to-noise ratio approaching that which is obtainable with a broadband camera. A stronger signal at a detector array can enable a variety of design and operational advantages, including shorter integration times, faster frame rates, use of smaller aperture lenses, smaller focal plane array pixels, and operation under low light levels, including extremely low light applications such as are frequently encountered during spectral analyses of biological samples. The use of a tunable notch filter-based mapping spectrometer in methods described herein ensures spatially centered and stacked spectral components. In addition, embodiments described herein enable use of a tunable notch filter that can be reversibly integrated with any of a variety of detectors, including current commercially available detectors. Embodiments described herein enable dynamic adjustment of scan rate, notch width, and other spectral filtering parameters, including the use of different spectral resolutions throughout a spectral region of interest.

Novel methods described herein enable tunability of a notch filter in such a manner as to cause a mapping spectrometer to function as a broadband imager. Some embodiments include the use of electronic switching between at least two imaging modes (1) high-frame rate broadband imaging and (2) hyperspectral imaging with high spectral resolution.

Throughout this application including in the claims, the symbol "~", which means "approximately", and the term "about" indicate that a value includes plus or minus 10% of the value. For example, "about 4" or "~4" means from 3.6-4.4 inclusive of the endpoints 3.6 and 4.4, and "about 1 nm" means from 0.9 nm to 1.1 nm inclusive of the endpoints 0.9 nm and 1.1 nm. As used herein, the term "equal" and its relationship to the values or characteristics that are "substantially equal" would be understood by one of skill in the art. Typically, "substantially equal" can mean that the values or characteristics referred to may not be mathematically equal but would function as described in the specification and/or claims. All size ranges described herein are inclusive of the lower and upper limit values. As used herein, the phrase "at least one or more of A, B, or C" is meant to include one or more of only A, one or more of only B, one or more of only C, or any combination of elements or steps listed. For example, the combinations AB, AC, BC, and ABC are meant to be included by use of this phrase. Also, any combinations having a plurality of one or more of any of the elements or steps listed are meant to be included by use of this phrase. A similar phrase for longer lists of elements or steps is also contemplated to indicate each element or step alone or any combination of one or more of any of the elements or steps listed.

The citation of any references herein is not an admission that such references are prior art for the present invention. It should be understood that the detailed description and the specific examples, while indicating specific embodiments of the invention, are given by way of illustration only, since various changes and modifications within the spirit and scope of the invention will become apparent to those skilled in the art from this detailed description. Other objects, features and advantages of the present invention will become apparent from the following detailed description.

BRIEF DESCRIPTION OF THE FIGURES

The following drawings form part of the present specification and are included to further demonstrate certain aspects of the invention. Embodiments of the invention may be better understood by reference to one or more of these drawings in combination with the detailed description of specific embodiments presented herein. The use of a letter following an element number is for descriptive purposes only. For example, 400a and 400b each refer to a metamaterial 400, but may refer to separate metamaterials in a figure as an aid in understanding the description of the figure. The following drawings are not necessarily drawn to scale or intended to be. For purposes of clarity, every component or structure that may be part of a tunable notch filter may not be depicted in every drawing, and every figure may not depict all components and structures or all measurements described herein. In some drawings and views, for purposes of clarity and for understanding embodiments of the invention the relative sizes of structural elements are not necessarily reflective of actual relative sizes in embodiments of the invention.

FIGS. 8A-8F show six examples of spectral intensity reconstruction using the Moore-Penrose pseudoinverse method and the basis function set of twenty notches shown in FIG. 7.

DESCRIPTION OF CERTAIN EXEMPLARY EMBODIMENTS

Figure 1:
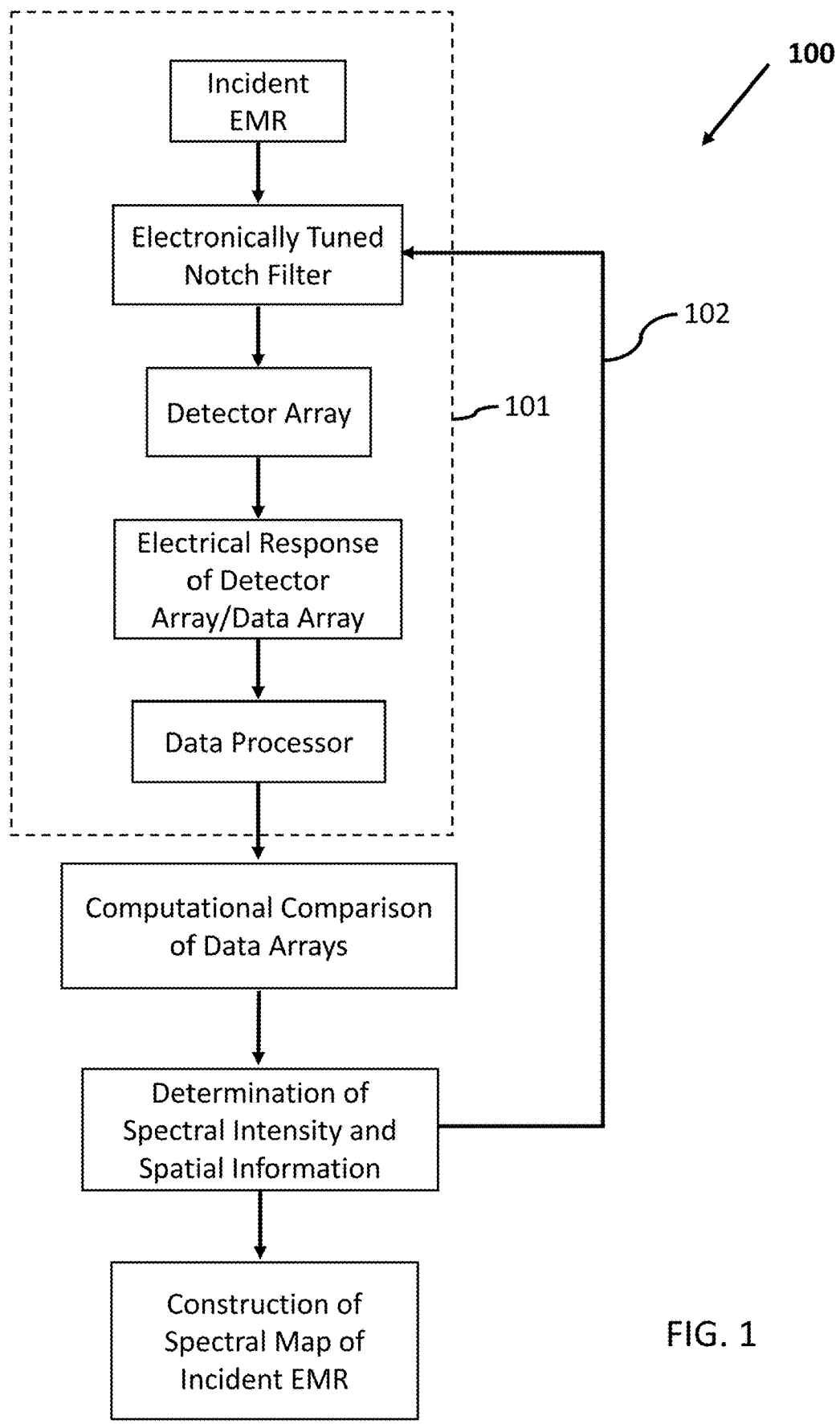
FIG. 1 is a flow chart representing a general overview of a method useful in some embodiments for constructing a spectral map of EMR that is incident on a notch filter for a plurality of selected time periods.

FIG. 1 is a flow chart 100 representing a general overview of a method useful in some embodiments for constructing a spectral map of EMR that is incident on a notch filter for a plurality of selected time periods. Embodiments described herein include methods and systems for analyzing EMR that make use of a tunable notch filter and a controller for electronically tuning the notch filter to pass EMR that is in a selected spectral band and incident on the notch filter to a detector array for a plurality of selected time periods, wherein the notch filter is tuned differently for each of the plurality of selected time periods and the EMR is passed by the notch filter. In some aspects, for at least a first selected time period in the plurality of selected time periods a notch filter is electronically tuned to selectively attenuate the passing of EMR, and a method may comprise, for at least the first selected time period, selectively attenuating the passing of EMR that is incident on the notch filter and in a first set of one or more than one sub-bands in the selected spectral band. Embodiments also include, for each of the plurality of selected time periods, determining an electrical response of the detector array to the EMR passed by the notch filter and receiving at a data processor a data array representative of the determined electrical response of the detector array to the passed EMR. Series 101 of steps is repeated for each of the plurality of selected time periods.

Many embodiments described herein may comprise computationally comparing two or more data arrays that are received by a data processor. In many aspects, the two or more compared data arrays include the data array representative of the determined electrical response of the detector array to EMR whose passing to the detector array is selectively attenuated for the first selected time period. In many aspects, methods include determining spectral intensity information and spatial information about the EMR that is incident on the notch filter and in the first set of one or more than one sub-bands in the selected spectral band. In some aspects, the received data arrays for each of the plurality of selected time periods and the determined information about the EMR that is incident on the notch filter and in the first set of one or more than one sub-bands are used for constructing a spectral map of the EMR that is in the selected spectral band and incident on the notch filter for the plurality of selected time periods.

In some aspects, electronic tuning of a notch filter may occur after a data array, representative of a detector array response to selectively attenuated and passed EMR for a previous selected time period, is compared with another data array and spectral intensity information and spatial information about the EMR incident on the notch filter and in a set of one or more than one sub-bands has been determined. The electronic tuning may then be selected and/or adjusted based on the determined spectral intensity and spatial information. In some aspects, represented by optional path 102, the determined spectral intensity information and spatial information about the EMR incident on the notch filter and in the set of one or more than one sub-bands may be fed to a data processor or an electronic controller and used by the data processor, the controller, or both to electronically tune the notch filter to a selected state for passing EMR for a subsequent time period.

Figure 2:
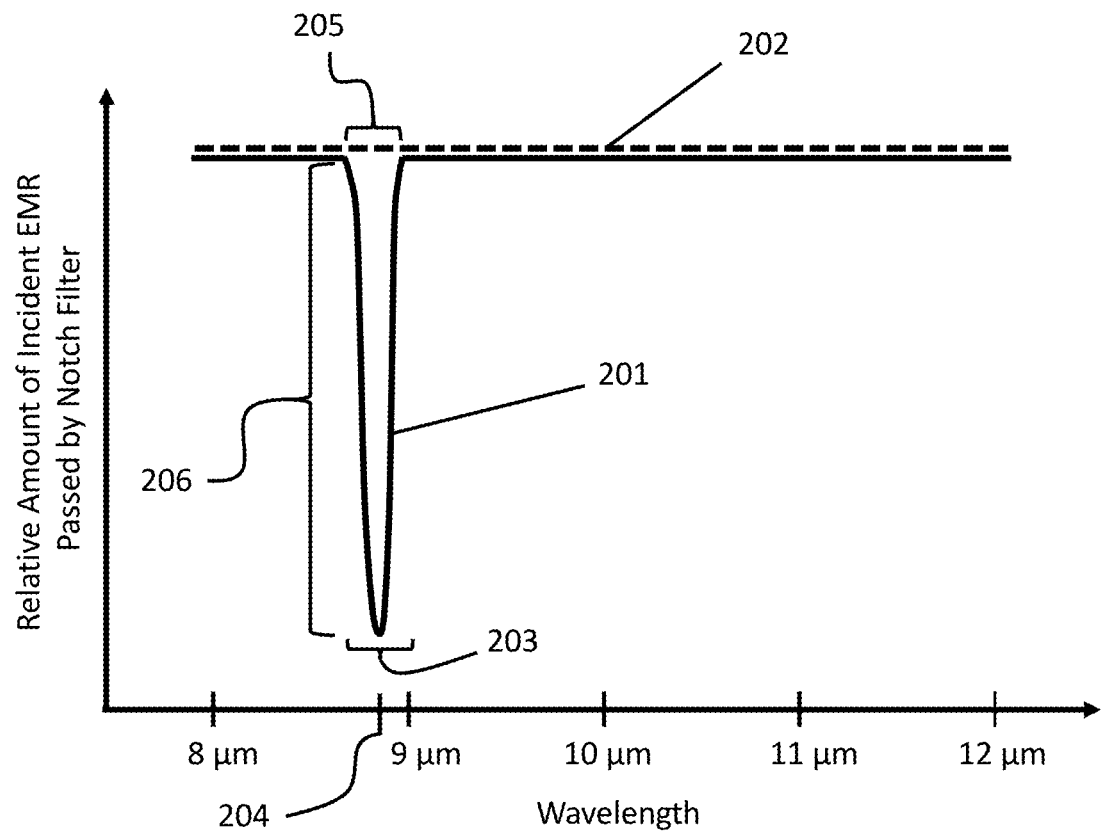
FIG. 2 schematically depicts the relative amount of EMR in a selected spectral band that is incident on and passed by a notch filter tuned to pass broadband EMR or selectively attenuated EMR.

FIG. 2 schematically depicts the relative amount of EMR in a selected spectral band from about 8 μm to about 12 μm that is incident on and passed by a notch filter tuned differently for each of two selected time periods to pass broadband EMR or selectively attenuated EMR. In this exemplary embodiment, for a first selected time period a notch filter is tuned to selectively attenuate the passing of a single sub-band of EMR that is incident on the notch filter, the sub-band having a wavelength range of about 200 nm and having a center wavelength 204 at about 8.8 μm. The relative amount of radiation in the selected spectral band that is passed for the first selected time period is represented by solid line 201, which indicates that passing of the single sub-band of EMR is attenuated during the selected time period as compared to the passing of EMR of other wavelengths in the selected spectral band. For a second selected time period, the notch filter is electronically tuned to operate in broadband mode without attenuating the passing of EMR in the selected spectral band from about 8 μm to about 12 μm. The relative amount of EMR in the selected spectral band that is passed for the second selected time period is represented by dashed line 202, which indicates that passing of EMR incident on the notch filter and in the selected spectral band is not selectively attenuated, and the notch filter tuned in this manner allows passing to the detector array of broadband EMR. Lines 201 and 202 are shown as slightly offset for ease of visibility.

For purposes herein, a selected spectral band refers to a continuous segment of the electromagnetic spectrum, and the term "sub-band" refers to a segment of the electromagnetic spectrum in a selected spectral band. In some aspects, methods described herein can be used for analyzing EMR in any selected spectral band in the region of the electromagnetic spectrum ranging from and including the soft X-ray region through and including the microwave region. Methods embodiments may be used for analyzing EMR in any selected spectral band of interest that may span any range of wavelengths in this region and for analyzing EMR in any set of one or more than one sub-bands in a selected spectral band of interest. By way of example only, methods described herein can be used for analyzing EMR in the visible, near infrared (NIR), mid-wave infrared (MWIR), and long-wave infrared (LWIR) spectral bands. By way of example only, a selected spectral band may be from about 7,000 nm to about 12,000 nm, and a sub-band in the 7,000 nm-12,000 nm selected spectral band can be a sub-band of EMR with wavelengths from about 8,000 nm to about 8,010 nm, from about 8,100 nm to about 8,300 nm, or from about 11,000 nm to about 12,000 nm.

In embodiments described herein, a notch filter may be electronically tuned to selectively attenuate the passing of EMR to a detector array, and a notch filter operating in this manner is said to be operating in "attenuation mode". EMR whose passing to a detector array is selectively attenuated by a notch filter may also be referred to herein as "selectively attenuated EMR". In some embodiments, for a single selected time period, a notch filter is electronically tuned to selectively attenuate the passing of EMR that is incident on the notch filter and is in one or more than one sub-bands of a selected spectral band. In some embodiments, a set of one or more than one sub-bands whose passing to a detector array is selectively attenuated has one sub-band, and in some aspects, the set of one or more than one sub-bands has a plurality of sub-bands. In some aspects, any set of one or more than one sub-bands of EMR in a selected spectral band may be selectively attenuated for a period of time using a tunable notch filter electronically tuned to a selected state.

In FIG. 2, lines 201, 202 represent the relative amounts of EMR, i.e., the spectral intensity of passed EMR across the selected spectral band from about 8 µm to about 12 µm, that is incident on and passed by a notch filter for a selected time period. The single sub-band of EMR, having a center wavelength at about 8.8 µm, whose passing is selectively attenuated may be referred to herein as a "notch" that is represented by the section of line 201 where the relative amount of passed EMR is attenuated in comparison with other parts of the selected spectral band where passage of EMR is not attenuated. For ease of description herein, the portion of line 201 that is representative of the selective attenuation of a sub-band of EMR is also referred to as a "notch" 203. In some embodiments described herein, a sub-band whose passing is selectively attenuated has a center wavelength 204, and center wavelength 204 may be referred to as the "notch wavelength" or "notch center wavelength".

In many embodiments, for a sub-band of selectively attenuated EMR, EMR having wavelengths on both sides of center wavelength 204 of notch 203 will be attenuated, and in some aspects, not all wavelengths of EMR in notch 203 will be attenuated to the same extent. In the example shown in FIG. 2, the passing of EMR having a wavelength of about 8.8 µm in a sub-band having a width of about 200 nm is attenuated to the greatest extent, and the passing of EMR of shorter and longer wavelengths in notch 203 and on either side of the center wavelength (8.8 µm) is attenuated to lesser extents. In a notch, the wavelength range across which at least some EMR is selectively attenuated is referred to herein as the notch "width" 205. In FIG. 2, notch width 205 is about 200 nm. As used herein, the extent of attenuation of a sub-band of EMR is referred to as the notch "depth" 206. For example, notch depth 206 in FIG. 2 is relatively large, and the relative amount of EMR, in a selectively attenuated sub-band of EMR, that is passed by the notch filter is low as compared to the amount of EMR whose passing is not selectively attenuated. In some aspects, notch width 205 can be much less that the width of the larger selected spectral band of interest. In some aspects, for example, notch width 205 is 1/N of the width of the selected spectral band being analyzed, where N is approximately the number of spectrally resolved sub-bands.

For selectively attenuated EMR in a sub-band, less than 100% of the EMR that is incident on a notch filter and in the sub-band is passed to a detector array. A notch filter can be electronically tuned to selectively attenuate the passing of EMR to a detector array by selectively attenuating the passing of about 1%, 2%, 3%, 4%, 5%, 6%, 7%, 8%, 9%, 10%, 15%, 20%, 30%, 40%, 50%, 60% 70%, 80%, 90%, up to 100% or any percentage between about 1% and up to 100% of EMR in a sub-band of a selected spectral band that is incident on the notch filter. A notch filter can not be tuned to attenuate the passing of more than 100% of EMR that is incident on a notch filter and in a selected spectral band or in a sub-band.

In some embodiments, EMR is passed to a detector array by a tunable notch filter that is operating in transmission mode. In some aspects, a notch filter that is tuned to selectively attenuate the passing of EMR while operating in transmission mode, is tuned to selectively attenuate transmission of the EMR. That is, the notch filter passes a lesser amount of the EMR in the sub-band than the amount that is incident on the filter. By way of example, in some aspects selectively attenuating the passing to a detector array of EMR can be achieved by tuning a notch filter such that the filter selectively attenuates transmission of the EMR in one or more than one sub-bands and does not selectively attenuate transmission of EMR outside of the one or more than one sub-bands. In some aspects, EMR is passed to a detector array by a tunable notch filter that is operating in reflection mode. In some aspects a notch filter that is tuned to selectively attenuate the passing of EMR while operating in reflection mode is tuned to selectively attenuate reflection of the EMR to a detector array by the notch filter, and the notch filter passes a lesser amount of the EMR than the amount that is incident on the filter.

Figure 3A:
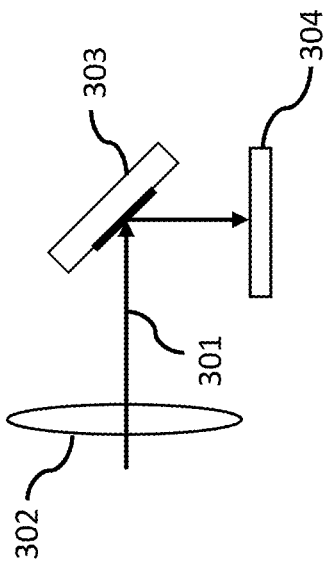
FIGS. 3A-3D show an exemplary embodiment of passing selectively attenuated EMR by a notch filter operating in reflection mode and electronically tuned to attenuate the passing of a single sub-band in a selected spectral band of EMR and the intensity of the reflected, attenuated EMR in the selected spectral band.
Figure 3B:
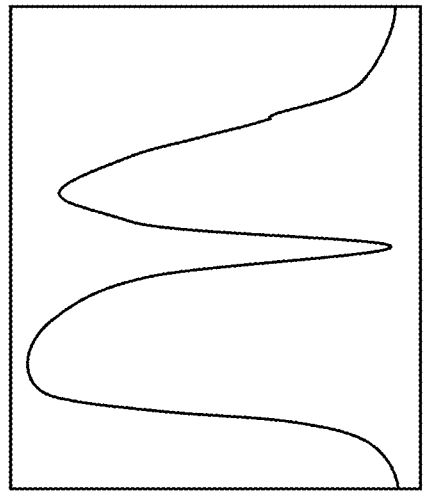
Figure 3C:
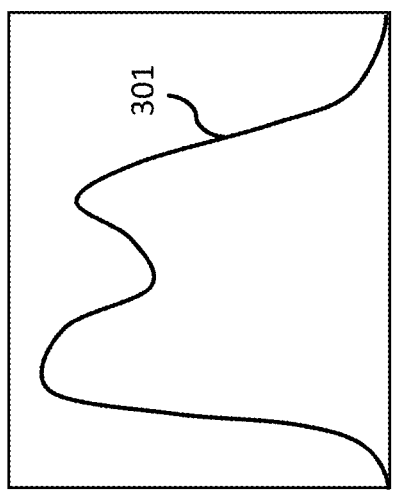
Figure 3D:
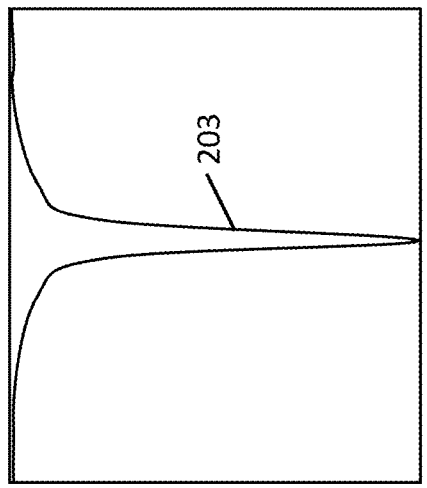

FIGS. 3A-3D show an exemplary embodiment of passing of selectively attenuated EMR by a notch filter operating in reflection mode and electronically tuned to selectively attenuate the passing of a single sub-band in a selected spectral band of EMR. Here, the intensity of EMR in the selected spectral band 301 of incident EMR is shown in FIG. 3A. As shown in FIG. 3B, incident EMR 301 is passed by an imaging optic 302 to electronically tunable notch filter 303 operating in reflection mode, thence passed by reflection to detector array 304. FIG. 3C depicts a single notch 203 of EMR whose passing, by reflection, is selectively attenuated by the selected tuning state of notch filter 303. FIG. 3D portrays the intensity of EMR in selected spectral band 301 that is passed by electronically tuned notch filter 303 operating in reflection mode.

In many embodiments, electronic tuning of a notch filter is regulated by a controller. A notch filter tuned differently for each of a plurality of selected time periods refers to a notch filter that is tuned to a different state of tuning for each selected time period. A notch filter that is tuned differently for each of a plurality of selected time periods will pass EMR differently for each of the time periods. The number of sub-bands of selectively attenuated EMR and notch center wavelength 204, notch width 205, and notch depth 206 of each sub-band whose passing is selectively attenuated for a given time period can be defined and modified by electronically tuning the notch filter differently, i.e., by tuning the notch filter to a selected state of tuning.

In some embodiments, a notch filter can be electronically tuned to a state so as to selectively attenuate the passing of EMR having a selected polarization state. That is, the passing of EMR in a selected spectral band or sub-band and having a selected polarization state may be selectively attenuated by appropriately tuning a notch filter. Some aspects further comprise determining polarimetric information about the EMR in a first set of one or more than one sub-bands and using the determined polarimetric information when constructing a spectral map of EMR in a selected spectral band that is incident on the notch filter for a plurality of selected time periods. In some aspects, selectively attenuating the passing of EMR that is incident on a notch filter and in a sub-band or spectral band may occur regardless of the polarization state of the incident EMR.

The tuning state of a tunable notch filter may be selected for one or more than one of a variety of reasons, including by way of example only, to enhance spectral and spatial discrimination within a captured scene, to enhance discrimination of chemical species when determining and/or quantifying the presence of one or more chemicals in a sample, to enhance detection of objects, forms, or bodies that are obscured, and/or other reasons for which it may be useful to enhance spectral, spatial, or polarimetric analysis of a scene. In some aspects, one or more sub-bands of EMR whose passing is to be selectively attenuated may be chosen based on selected characteristics of a scene that is to be spectrally mapped. For example only, one or more sub-bands whose passing is to be selectively attenuated may be chosen based on spectral and/or polarimetric characteristics that can be useful for enhancing contrast in a scene.

In some embodiments, a notch filter may be electronically tuned to pass broadband EMR to a detector array for a selected time period, without selectively attenuating the passing of EMR in a selected spectral band or sub-band. That is, the filter can be tuned to a state that allows for the passing, for a selected time period, of all EMR across an entire selected spectral band of interest (i.e., broadband EMR) to the detector array. An electronically tunable notch filter operating in this manner is said to be operating in "broadband mode".

In some embodiments, broadband mode operation of a tunable notch filter can be achieved by electronically tuning the notch filter so as to position notch center wavelength 204 outside of a selected spectral band, such that passing of EMR in the selected spectral band that is incident on the notch filter is not selectively attenuated. In some aspects, a notch filter can be electronically "turned off" or deactivated so that the passing of EMR in a selected spectral band that is incident on the notch filter is not selectively attenuated. In some aspects, a notch filter that is electronically deactivated is considered to be electronically tuned and tuned to a selected state. It is to be noted that in some aspects, a notch filter electronically tuned to pass EMR without selectively attenuating the passing of EMR incident on the notch filter may nonetheless attenuate to some extent the passing of some incident EMR to the detector array. This is in contrast to a notch filter that is tuned to "selectively attenuate" the passing of EMR that is in one or more than one sub-bands or notches in a selected spectral band. Broadband EMR can be passed to the detector array for one or more than one selected time periods.

In embodiments described herein, a selected time period for passing of EMR is determined by the state of tuning of a notch filter. In some aspects, each time period in a plurality of selected time periods can have a different length. In some aspects, one or more selected time periods in a plurality of selected time periods may be of the same length or about the same length. The length of a selected time period may be selected based on any of a variety of reasons. By way of example only, the length of a selected time period may be selected based on at least one or more of the sensitivity of a detector array to one or more wavelengths of EMR, the nature of a scene being analyzed, motion of objects in a scene being analyzed, or the spectral intensity of EMR being analyzed, to name a few, or the length of a selected time period may be selected based on any combination of these considerations.

In some embodiments, a method for analyzing EMR makes use of a mapping spectrometer that comprises an electronically tunable notch filter, a controller for electronically tuning the notch filter, a detector array for receiving EMR passed by the notch filter, and a computational processor for receiving and comparing data arrays. In some aspects, for each of a plurality of selected time periods, an electrical response of a detector array to EMR passed for the selected time period is determined and a data array representative of the determined electrical response is received at a data processor. When determining an electrical response of a detector array to passed EMR, it is not required that the electrical response be determined for all pixels in the detector array. In some aspects, a determined electrical response of a detector array may be a determined electrical response of less than all pixels on a detector array. Determining an electrical response of a detector array to passed EMR means determining an electrical response of two or more than two pixels in a detector array. As such, a data array representative of a determined electrical response of a detector array may comprise information about EMR passed to two or more than two pixels on the detector array. Some embodiments described herein may comprise computationally comparing two or more of the data arrays received by the data processor.

In some embodiments a method comprises, for at least a first selected time period in a plurality of selected time periods, selectively attenuating the passing of EMR that is incident on a notch filter and in a first set of one or more than one sub-bands in a selected spectral band of EMR. In some aspects then, a data array may lack some or all of spectral intensity information, spatial information, and polarimetric information about the EMR that is in the first set of one or more than one sub-bands of selectively attenuated EMR. This type of data array may be referred to herein as a "notched data array". In some aspects, a method comprises computationally comparing two or more than two data arrays received by a data processor, wherein the two or more than two data arrays include the data array representative of the determined electrical response of the detector array to the EMR passed for the at least first selected time period (i.e., the notched data array).

In some embodiments a method comprises, for at least a second selected time period in a plurality of selected time periods, passing EMR that is incident on the notch filter and in the selected spectral band to a detector array, without selectively attenuating the passing of the incident EMR in the selected spectral band. In some aspects then, the plurality of data arrays received at the data processor may include a data array representative of the determined electrical response of the detector array to the EMR passed for the second selected time period, which is broadband EMR. A data array representative of a determined electrical response of a detector array to broadband EMR is also referred to as a "broadband data array". In some aspects, computationally comparing two or more received data arrays comprises comparing a notched data array representative of the determined electrical response of the detector array to selectively attenuated EMR passed for at least a first selected time period with a broadband data array representative of the determined electrical response of the detector array to broadband EMR passed for at least a second selected time period. From this type of comparison, spectral intensity information and spatial information can be determined about the EMR that is incident on the notch filter and in the first set of one or more than one sub-bands, and whose passing to the detector array was selectively attenuated for the first selected time period. In some aspects of a method, a plurality of notched data arrays may each be compared with a single broadband data array representative of a detector array response to passed EMR for a single time period, wherein the single time period is selected to be within the range of time periods corresponding to those for which selectively attenuated EMR was passed to a detector array. Methods described herein that utilize one or more of these types of data array comparisons can be superior to conventional methods for determining at least one or more of spectral intensity information, polarimetric information, or spatial information about EMR from a scene of interest. Using the received data arrays for each selected time period in a plurality of selected time periods and the determined information about the EMR that is incident on the notch filter and in the first set of one or more than one sub-bands, a spectral map of the EMR that is in the selected spectral band and incident on the notch filter for the plurality of selected time periods filter can be constructed.

In some embodiments, a method comprises, for at least a second selected time period in a plurality of selected time periods, selectively attenuating the passing of EMR that is incident on the notch filter and in a second set of one or more than one sub-bands in the selected spectral band. In some aspects then, the plurality of data arrays received at the data processor include a data array representative of the determined electrical response of the detector array to EMR passed for the at least second selected time period. Methods may also include computationally comparing two or more data arrays wherein the compared data arrays include at least the data arrays representative of the electrical response of the detector array to the selectively attenuated EMR passed for the at least first selected time period and to the selectively attenuated EMR passed for the at least second selected time period.

In many embodiments, a notch filter may be tuned to simultaneously and selectively attenuate the passing of EMR in a plurality of sub-bands in a selected spectral band. In some embodiments, selectively attenuating the passing of EMR in a plurality of sub-bands for a selected time period can be useful for reducing the length of one or more time periods for the passing of the EMR and/or for reducing spectral-temporal artifacts in a constructed spectral map.

In embodiments described herein, determining from two or more compared data arrays, spectral intensity information and spatial information about the EMR that is in a first set of one or more than one sub-bands of a selected spectral band incident on the notch filter may include determining information about one sub-band in a set of sub-bands and/or determining information about a plurality of sub-bands in the set of sub-bands. Determining polarimetric information may include determining of polarimetric information about one or a plurality of sub-bands in a set of sub-bands.

In some aspects, a method may include determining from two or more compared data arrays, spectral intensity information and spatial information about EMR that is incident on a notch filter and in a first set of one or more than one sub-bands and spectral intensity information and spatial information about EMR that is incident on a notch filter and in a second set of one or more than one sub-bands. In some embodiments, methods include constructing a spectral map of the EMR that is incident on a notch filter and in a selected spectral band by using the received data arrays for each selected time period in a plurality of selected time periods and the determined information about the EMR that is incident on the notch filter and in one or both of the first and second sets of one or more than one sub-bands.

In some embodiments, for example where passed EMR is selectively attenuated for at least a first and a second time periods and the computationally compared two or more data arrays include at least a notched data array determined for a detector array response to EMR passed for the first time period and a notched data array determined for the detector array response to EMR passed for the second time period, the first set of one or more than one sub-bands and the second set of one or more than one sub-bands may have no sub-bands in common or may have one or more than one sub-bands in common. In some aspects, at least one sub-band from one or both of the first set of one or more sub-bands and the second set of one or more sub-bands is not common to both the first set and the second set of one or more sub-bands.

In some aspects, a selectively attenuated sub-band of EMR in a first set of one or more than one sub-bands and a selectively attenuated sub-band of EMR in a second set of one or more than one sub-bands may be overlapping sub-bands or may be the same sub-band. Because a notch filter is tuned differently at each time point, in some aspects where a selectively attenuated sub-band in a first set has a center wavelength 204 that is the same as a center wavelength 204 of a selectively attenuated sub-band in a second set, the sub-band will often be attenuated differently between the sets, e.g., notch depth 206 will be different for the first and second selected time periods. As such, it can be said that attenuation of the passing of a selected sub-band in the first set of one or more than one sub-bands occurs to a different extent than the attenuation of the passing of a selected sub-band in the second set of one or more than one sub-bands. In some aspects, where the center wavelength of one or more than one sub-bands are the same in a first set and a second set of sub-bands, the selectively attenuated EMR in the one or more than one sub-bands in the first set may have a different polarization state than the selectively attenuated EMR in the one or more than one sub-bands in the second set.

In some embodiments, a notched data array that is representative of an electrical response of a detector array to selectively attenuated EMR passed for a first selected time period can be compared to one or more than one other notched data arrays that are representative of an electrical response of a detector array to selectively attenuated EMR passed for one or more than one other selected time periods. From the plurality of compared data arrays, spectral intensity and spatial information about the selectively attenuated EMR passed for the first selected time period and/or about selectively attenuated EMR passed for any of the other selected time periods can be determined and used in constructing a spectral map of the EMR in a selected spectral band that is incident on a notch filter for a plurality of selected time periods. Some aspects may further comprise using polarimetric information about the selectively attenuated EMR passed for the first selected time period and/or about selectively attenuated EMR passed for any of the other selected time periods in constructing a spectral map of the EMR in a selected spectral band that is incident on the notch filter for a plurality of selected time periods.

In some embodiments, when a notch filter is electronically tuned differently for each of a plurality of selected time periods, a data array that is representative of a determined electrical response of a detector array to passed EMR for a first selected time period may be different from a data array that is representative of a determined electrical response of the detector array to EMR that is passed for each other selected time period. As such, in some aspects comparing two or more received data arrays can mean comparing two data arrays that are different from each other and in some aspects can mean comparing more than two data arrays that are each different from one another.

Some embodiments comprise, for each of a plurality of selected time periods, selectively attenuating the passing of EMR from an electronically tuned notch filter to a detector array, the selectively attenuated EMR being in a single sub-band in a selected spectral band of EMR that is incident on the notch filter. In some aspects, a notch filter is tuned so as to sequentially position notch center wavelength 204 from one side of a selected spectral band to the opposite side of the selected spectral band, and for each tuning state a data array representative of the electrical response of the detector array to EMR passed for each selected time period is determined and received at a data processor. In this manner, a notched data array can be determined for each of the selected time periods, wherein notch center wavelength 204 of a single notch is different for each selected time period. In some aspects, for each selected time period in the plurality of selected time periods notch center wavelength 204 may be selected to be any wavelength distance from the notch center wavelength 204 selected for the previous time period. For determining information about the EMR incident on the notch filter and in the single sub-band whose passing is selectively attenuated for each selected time period, a computational algorithm can be used for comparing two or more of the received data arrays.

In some embodiments, notch center wavelength 204 is sequentially positioned from one side of a selected spectral band to the opposite side of the selected spectral band and is the center wavelength of a selectively attenuated sub-band, which may have a notch width 205 that is about 1/N of the width of the selected spectral band, where N represents the desired number of resolvable spectral sub-bands. In some of these aspects, the notch filter may be electronically tuned to sequentially position notch center wavelength 204 about one notch width 205 away from the notch center wavelength 204 position for the previous time period.

In some aspects, a notch filter may be tuned so as to position notch center wavelength 204 from one side of a selected spectral band to the opposite side of the selected spectral band, in any selected order of notch center wavelength 204 positions (e.g., in a non-sequential order), and for each selected time period a data array representative of the electrical response of a detector array to EMR passed for the selected time period may be determined and received at a data processor. In these aspects, the order of the selected positions of notch center wavelength 204 for a plurality of selected time periods may be selected for any of a variety of reasons, including for example only, to minimize artifacts that can result from scene motion, to reduce power consumption, to achieve non-uniform spectral resolution or for any combination of these reasons. In some embodiments, a tunable notch filter is rapidly tunable. For example, a notch filter can be tuned sufficiently rapidly so that EMR can be passed to a detector array for a plurality of selected time periods and the electrical response of a detector array to the passed EMR can be converted to a data array within a selected short time period. For example only, a tunable notch filter may be tuned to thirty different states within 0.5 sec, such that EMR can be passed by the notch filter to a detector array at a rate of 60 times per second. In this exemplary aspect, data arrays can be compared and spectral intensity and spatial information about one or more than one sub-bands can be rapidly determined for constructing a spectral map of the EMR that is in a selected spectral band and incident on the notch filter. In some aspects, a selected time period for passing EMR from a notch filter to a detector array may range from ten milliseconds to hundreds of milliseconds and in some aspects may range from about 10 milliseconds to about 100 milliseconds inclusive.

In some embodiments, a detector array for use with methods described herein may be a CCD array, CMOS array, back-thinned CCD array, focal plane array including InGaAs, InSb, PtSi, CdTe, PbSe, and HgCdTe focal plane arrays, microbolometer array, silicon array, organic photodetector array, Golay cell array, rectenna array, or an antenna array. In some aspects, a useful detector array may be an uncooled LWIR imager or a broadband imager such as a camera. Some detector arrays useful in mapping spectrometers are commercially available. In some aspects, useful detector arrays may have a pre-determined sensitivity to EMR in one or more than one selected bands of the electromagnetic spectrum. In some embodiments, one or more than one detector arrays may have a wavelength-converting coating. Useful detector arrays may comprise pixel arrays having a variety of shapes, sizes, and dimensions. In some embodiments, the array of pixels on a detector is at least a 2×2 array. In some aspects, the array of pixels on a detector comprises between 2 pixels and about $10^{12}$ pixels inclusive of 2 and $10^{12}$ pixels.

In some embodiments, a detector array may have computational processing (i.e., data processing) capabilities, such as for example only, a digital-pixel FPA (DFPA). In some of these aspects, some or all computations for converting an electrical response of a detector array to a data array can occur at the detector array. In some aspects a detector array and a data processor may be integrated, and the computationally comparing of received data arrays may be executed by the data processor.

In some embodiments, electronically tuning a notch filter is accomplished by a controller, which is typically an electronic circuit. As such, the controller dictates the state to which the controllable notch filter is tuned. In some aspects, when a mapping spectrometer is operating in attenuation mode, the parameters of a spectral notch, e.g., notch width 205, notch depth 206, and center wavelength 204, to name a few, can be tuned by adjusting the voltage applied to the tunable notch filter (the tuning voltage) using the controller. In some aspects, a controller may tune a notch filter to operate in broadband mode by electronically tuning the notch filter to place notch center wavelength 204 at a position outside of a selected spectral band. In some aspects, a controller may switch off thereby allowing EMR within a selected spectral band to pass unattenuated to a detector array or to pass to a detector array without selective attenuation.

In some embodiments, a useful electronically tunable notch filter may be a commercially available notch filter and can use any of a variety of technologies including acousto-optic tunable filters (AOTFs), scanning diffractive optics, liquid crystal light modulators, and Fabry-Perot (FP) etalons based on micro-electromechanical systems (MEMS). In some aspects, a tunable notch filter may be integrated with a detector array. In an exemplary aspect, a tunable notch filter that comprises a metamaterial may be used and may be fabricated to be integrated with and on a detector array.

In some embodiments, a tunable notch filter that is useful with methods for analyzing EMR as described herein can comprise one or more than one metamaterials, each metamaterial being separately and electronically tunable, and the notch filter can be electronically tuned by electronically tuning the one or more than one metamaterials. In one exemplary aspect, a metamaterial for use in a tunable notch filter comprises an array of electrically connected graphene nanoantennas and may also be referred to herein as a graphene metamaterial. FIGS. 4A-4D schematically illustrate views of different types of graphene metamaterial tunable notch filters and selected components of a graphene metamaterial useful as a tunable notch filter. In some aspects, for example in the schematic exemplary embodiment shown in FIGS. 4A-4B, a graphene metamaterial 400 (shown from a side view in FIG. 4A) for use with methods described herein has an array 401 of graphene nanoantennas 402 that are electrically connected graphene nanodisks (shown from a top down view in FIG. 4B). In some aspects, the graphene nanoantennas 402 may be positioned adjacent to and in contact with each other, thereby forming a continuous, electrically conductive layer (FIG. 4B). The exemplary embodiment of the graphene metamaterial in FIG. 4A comprises a substrate 404, such as for example a Ge substrate, that is configured to function as a bottom electrode, a thin film insulator 405 positioned on the Ge substrate, top 406 and buried 407 electrode contacts, and electrically connected graphene nanoantennas 402, here nanodisks, that are patterned into array 401 positioned on the thin film insulator 405 and configured to function as a top electrode. In some embodiments thin film insulator 405 may be a dielectric. In some aspects by way of example only, a dielectric insulator layer has a thickness of about 50 nm. In some embodiments, an insulator thickness is chosen to be as thin as is possible, while still avoiding electrical short, so as to enhance tunability. In some aspects, thin film insulator 405 may be positioned on a substrate configured to function as an electrode, such as in this exemplary embodiment, or thin film insulator 405 may be positioned on an electrode that itself is positioned on a substrate. In some embodiments, a substrate or a substrate configured to function as an electrode has a thickness of about 100 μm. In some aspects it is preferred that a substrate be thin enough so as to minimize absorption of the EMR and be thick enough to provide mechanical stability during fabrication and operation. In many embodiments, electrode contacts 406, 407 have a thickness of about 2 μm. In some embodiments, electrode thickness is selected so as to provide a resistivity that is at least 10× lower than that of the graphene.

Figure 4A:
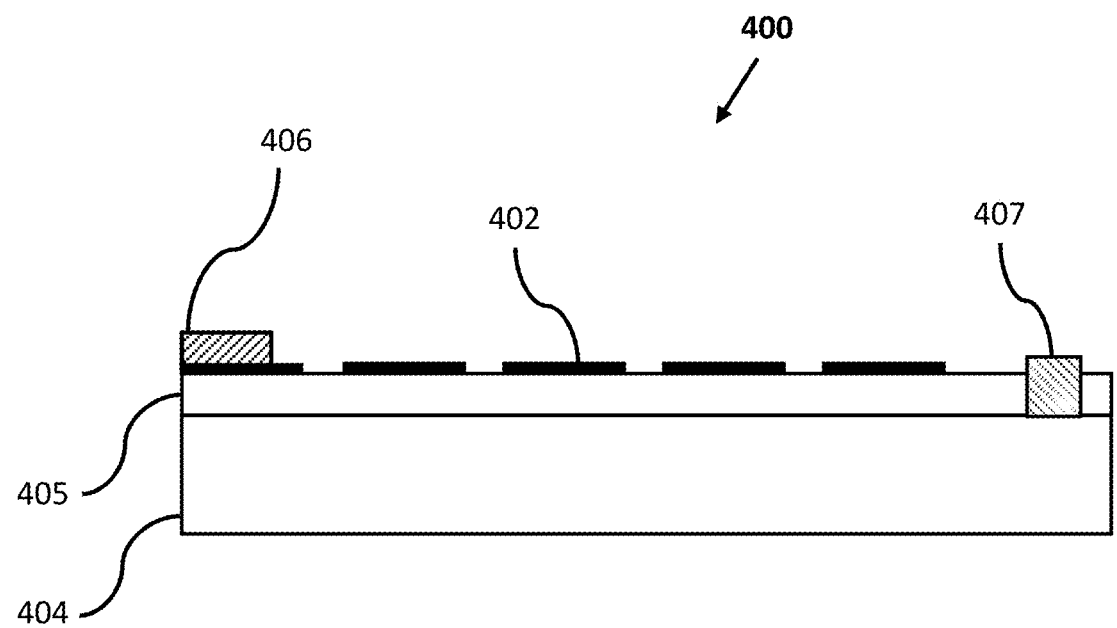
FIGS. 4A-4D schematically illustrate views of different types of graphene metamaterial tunable notch filters and selected components of a graphene metamaterial useful as a tunable notch filter.
Figure 4B:
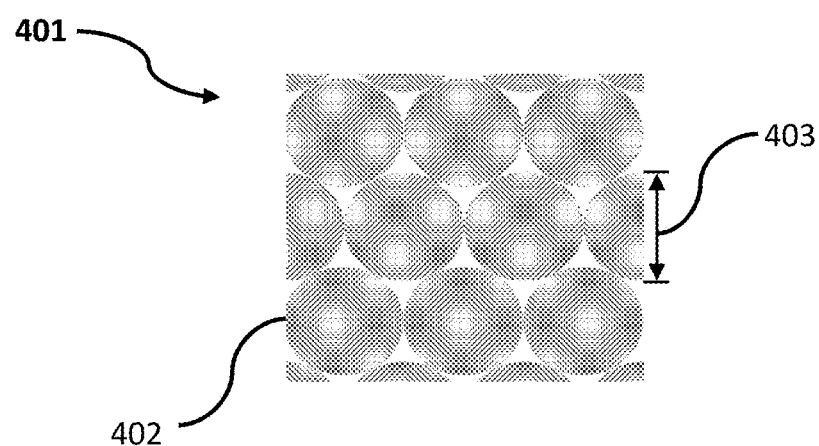

In the exemplary embodiment shown in FIGS. 4A-4B, for ease of description, only five graphene nanodisks 402 are represented in the schematic side-view in FIG. 4A. In many aspects, the number of graphene nanodisks or graphene nanoantennas 402 having other geometrical configurations and useful in array 401 can be from about 10 to about 1,000,000 or more in each dimension. In some aspects, the minimum array size in each dimension should be large enough so that the lateral extent of the array has a dimension that is at least the minimum wavelength of interest so as to provide a sufficiently strong interaction cross section with the incident EMR. In some embodiments, the lateral extent of an array may be larger, so as to match the size of commonly used electro-optical components such as for example a detector array, which can often have dimensions from about 1 mm to about 40 mm. In many embodiments, an array 401 for use in a tunable notch filter may range from about 10,000 nanoantennas to about 400,000 nanoantennas. In some aspects, nanoantennas 402 in array 401 may all be of the same or essentially the same geometrical shape. In some aspects, nanoantennas may be ribbon-shaped, rectangular, elliptical, or other geometrical shape. Non-isometric antenna shapes, such as ellipses and ribbons, can provide filtering characteristics that are dependent on the polarization state of incident EMR. For example, in some embodiments an array of ribbons may function differently for EMR polarization states that are either parallel or perpendicular to the direction that the ribbons extend. In some aspects, a nanoantenna array of geometric shapes can include an interleaved combination of two or more shapes so that a tunable filter has a behavior that can combine the filtering characteristics of the component shapes.

In some embodiments for selectively attenuating EMR, graphene nanodisks 402 are electronically tuned to resonate at a specific wavelength that is determined by material parameters, nanodisk diameter (D) 403, and an applied tuning voltage (gating voltage). Some exemplary material parameters include the permittivity of the materials above and below the patterned graphene, such as the dielectric insulator below the patterned graphene, e.g., aluminum oxide having a permittivity of approximately 5.76× the vacuum permittivity ($8.854 \times 10^{-12}$ F/m). The resonance of a graphene metamaterial can be adjusted by adjusting the tuning voltage applied to the metamaterial. In one exemplary aspect, array 401 with nanodisks 402 having a relatively larger D 403 of about 166 nm may be useful for and electronically tunable for attenuating the passing of a sub-band having a center wavelength 204 of approximately 11 μm. In another exemplary aspect, array 401 with nanodisks 402 having a relatively smaller D 403 of about 90 nm may be useful for and electronically tunable for attenuating a sub-band having a center wavelength 204 of about 8 μm.

In some embodiments, a tunable notch filter for use in methods described herein may comprise a plurality of metamaterials 400 wherein each metamaterial is separately tunable by an electronic controller and wherein the notch filter is tunable by electronically tuning one or more than one of the plurality of metamaterials. In some embodiments, this type of notch filter can be useful for analyzing EMR in a selected spectral band that is from about 0.4 μm to about 15 μm inclusive, from about 3 μm to about 5 μm inclusive, and/or from about 8 µm to about 12 µm inclusive. In one exemplary aspect, each of the plurality of metamaterials, is a graphene metamaterial 400 and comprises an array of electrically connected graphene nanoantennas 402 that are nanodisks. In some aspects, a tunable notch filter that is a metamaterial may be combined with, by way of example only, an uncooled LWIR detector array (microbolometer) for use in methods described herein.

Figure 4C:
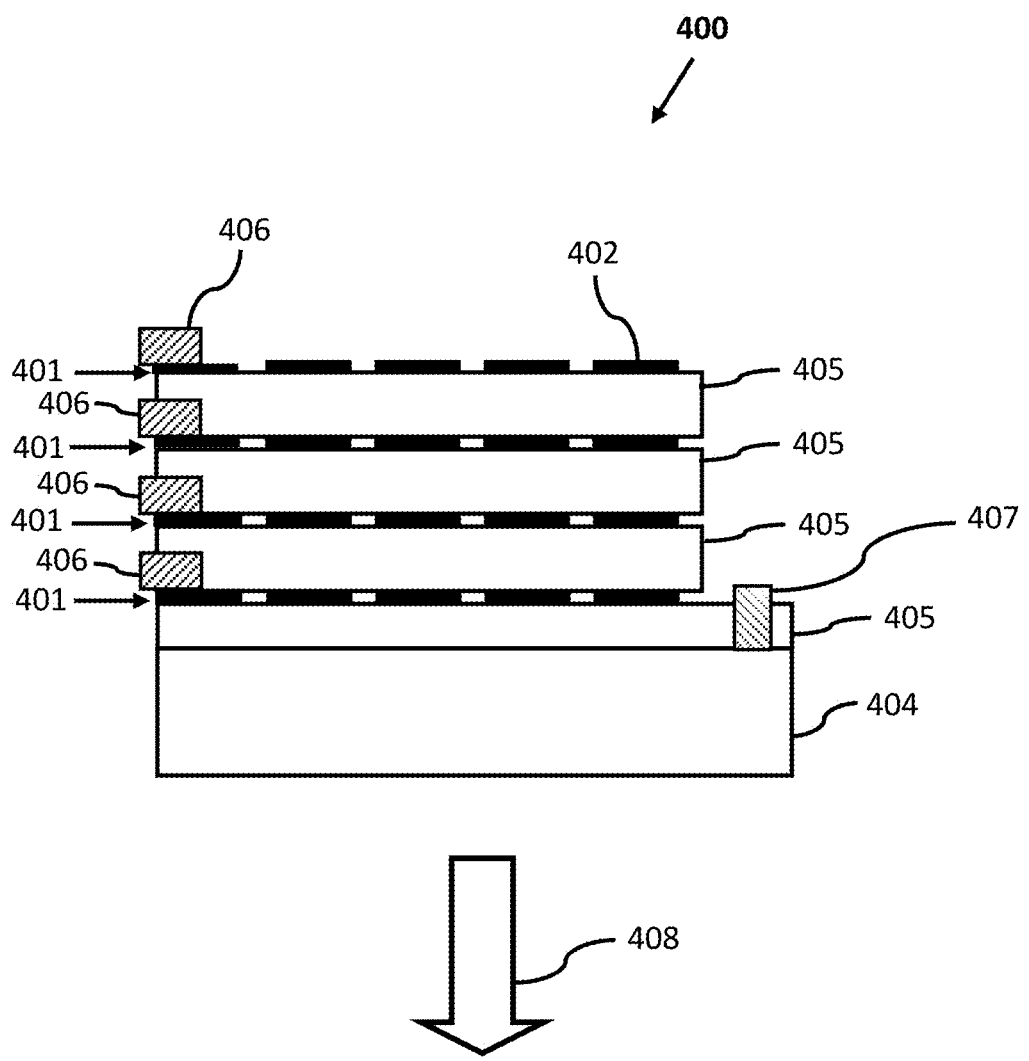
Figure 4D:
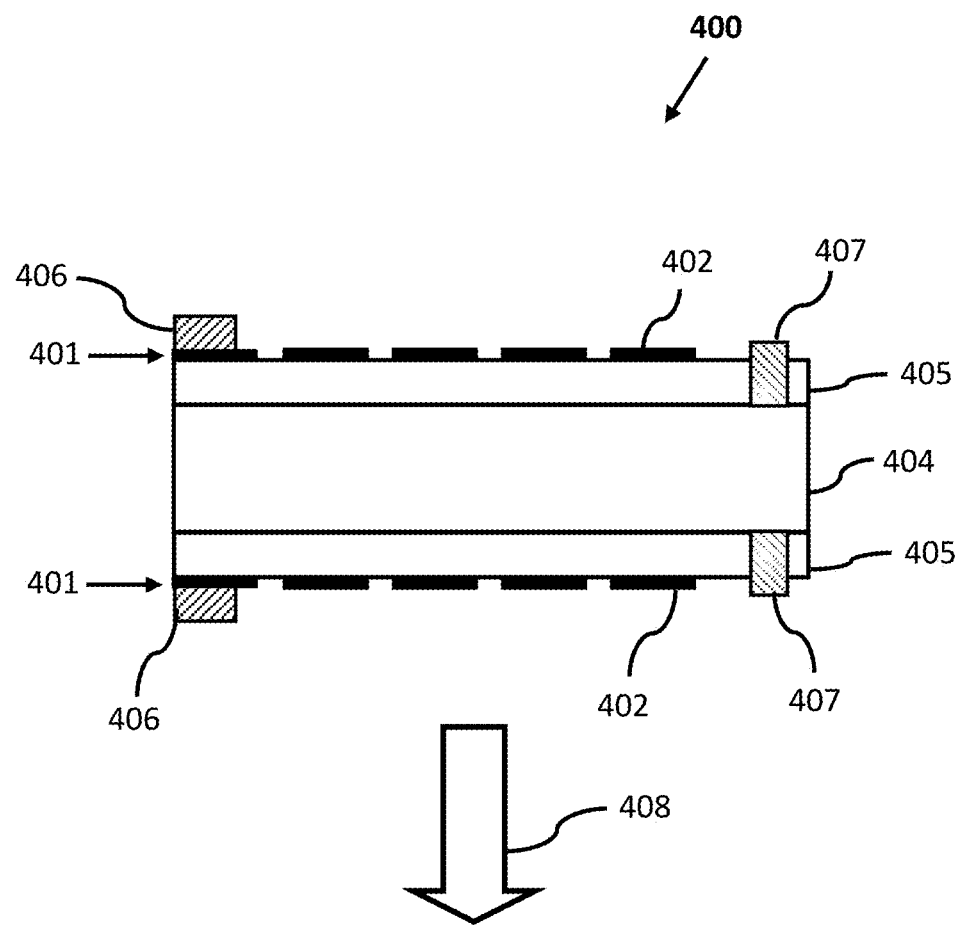

In some embodiments, such as for example that shown in FIG. 4C, a tunable notch filter for passing EMR 408 may comprise a metamaterial 400 that comprises a plurality of arrays 401 of electrically connected nanoantennas 402, wherein the plurality of arrays 401 are stacked on a single substrate 404 and a thin film insulator 405 is positioned between adjacent arrays 401. In some embodiments, FIG. 4D, a tunable notch filter for passing EMR 408 may comprise a metamaterial 400 having a substrate 404 and one or more than one arrays 401 of electrically connected nanoantennas 402 disposed on each side of the substrate with a thin film insulator 405 positioned between array 401 and substrate 404.

In some embodiments, a tunable notch filter comprising a plurality of individually tunable graphene metamaterials can be useful for analyzing EMR in a selected spectral band that comprises all or part of the LWIR region of the electromagnetic spectrum. The tunable graphene metamaterials may be fabricated to achieve high-extinction selective attenuation of EMR in a set of one or more than one sub-bands of a selected spectral band. By way of example only, one or more than one of the sub-bands in a set of selectively attenuated sub-bands may have a width of 1 µm, with a 0.2 µm full-width half-maximum (FWHM) sub-band width. In some aspects, by electronically tuning one or more than one of a plurality of metamaterials in a tunable notch filter, the passing of EMR in a sub-band having a notch center wavelength 204 anywhere in the LWIR region of the electromagnetic spectrum can be selectively attenuated for a selected time period.

In yet another exemplary aspect, a tunable notch filter comprising four graphene metamaterials may be electronically tuned to selectively attenuate the passing one or more than one sub-bands of EMR in a selected spectral band, each sub-band having a center wavelength 204 anywhere in a selected spectral band of LWIR radiation from about 7.5 µm to about 11.5 µm. In some embodiments, nanodisk diameters 403 in array 401 can be selected so that at a tuning voltage of 0 V resonance occurs at wavelengths much longer than 11.5 µm, effectively deactivating the selective attenuation of EMR by the metamaterial notch filter and enabling the passing to a detector array of broadband EMR in the selected spectral band of LWIR radiation from about 7.5 µm to about 11.5 µm. In some aspects, applying a tuning voltage of about 3 V can cause a metamaterial resonance to be in a sub-band having a notch width 205 of about 1 µm. In some aspects, the location of resonance is dependent on the tuning voltage applied.

Figure 5:
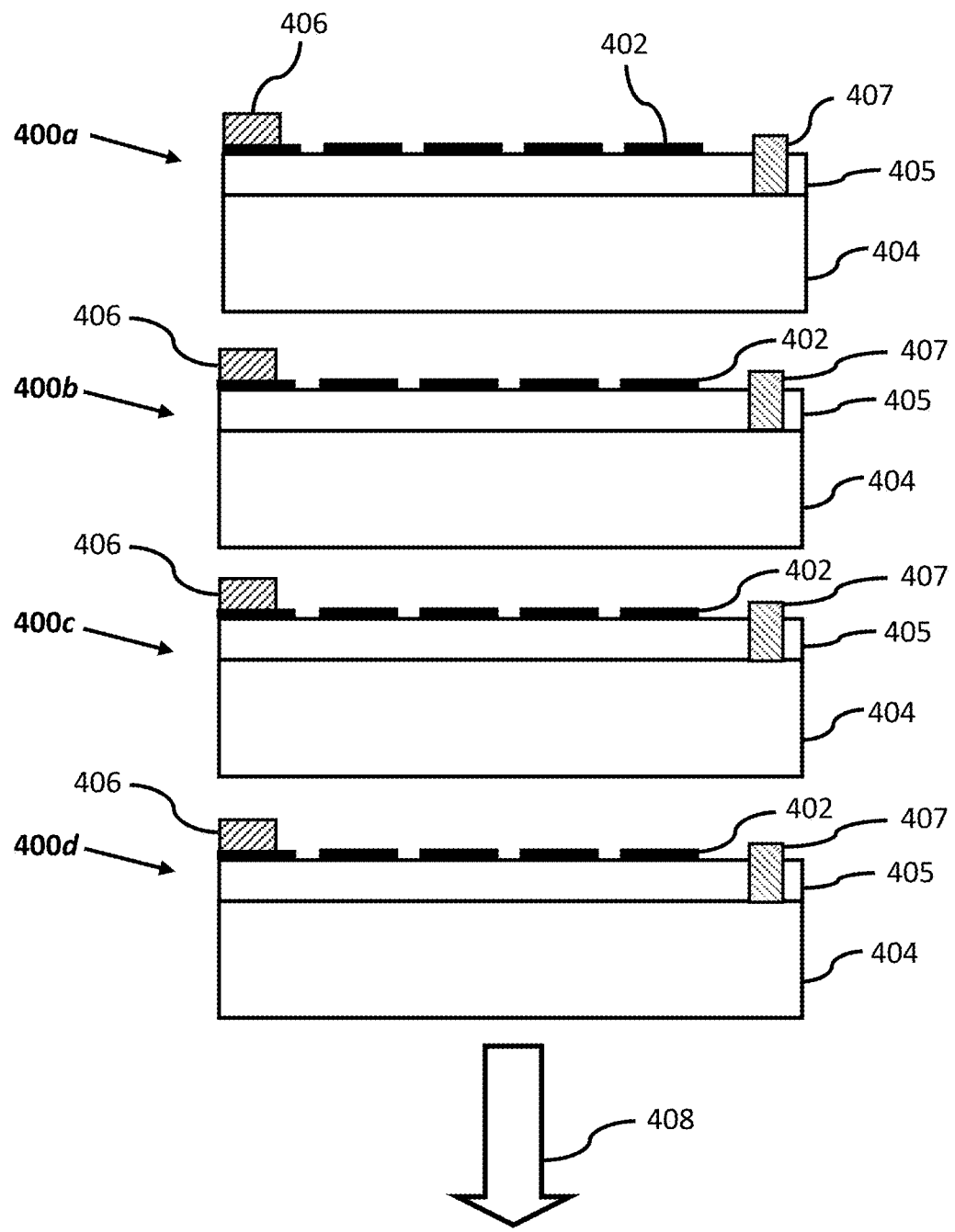
FIG. 5 is a schematic side view of a stack of four graphene metamaterials useful as a tunable notch filter.

FIG. 5 shows an exemplary embodiment and schematically depicts an exploded side-view of a stack of four individually tunable metamaterials 400a, 400b, 400c, 400d that can be used as a tunable notch filter in some aspects described herein. In some aspects, for a notch filter comprising four metamaterials and operating in broadband mode, the tuning voltage for each metamaterial can be set to 0 V thereby deactivating the selective attenuation of EMR by all four metamaterials, such that EMR 408 passed by the plurality of metamaterials is broadband EMR. In the exemplary embodiment depicted in FIG. 5, each metamaterial is a graphene metamaterial and comprises a Ge substrate 404 configured to function as a bottom electrode, a thin film insulator 405 positioned on the Ge substrate, top 406 and buried 407 electrode contacts, and electrically connected graphene nanodisks 402 patterned into an array 401 that is configured to function as a top electrode and is positioned on thin film insulator 405.

Figure 6:
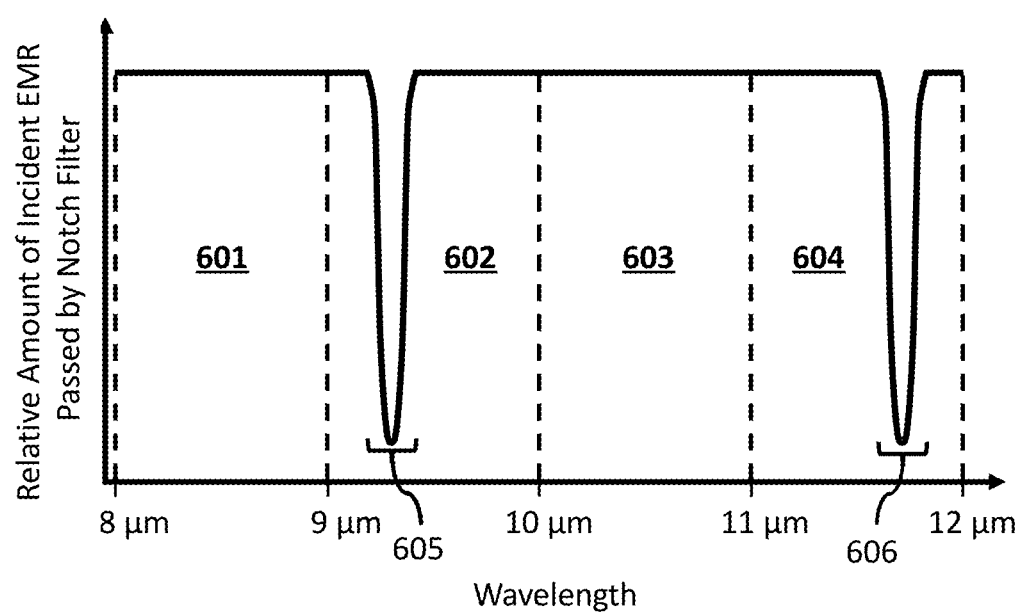
FIG. 6 illustrates the relative amount of incident EMR that is passed by a notch filter tuned to selectively attenuate the passing of EMR in two sub-bands in different subregions of a selected spectral band.

In one exemplary embodiment, for operation in attenuation mode, each metamaterial in a stack of metamaterials may be electronically tunable for selectively attenuating the passing of EMR in one or more than one sub-bands in a selected spectral band of EMR. FIG. 6 illustrates the relative amount of incident EMR that is passed by a notch filter tuned to selectively attenuate the passing of EMR in two sub-bands in different subregions of a selected spectral band. In this exemplary embodiment, the selected spectral band of EMR from 8 µm to 12 µm is shown as being divided into in four subregions 601, 602, 603, 604, each subregion having a width of 1 µm. In some aspects, one or more than one metamaterials (e.g., one or more than one of 400a, 400b, 400c, 400d shown in the stack of four individually tunable metamaterials in FIG. 5) can be electronically tuned to selectively attenuate the passing of EMR in one or more than one sub-bands in a single subregion. By way of example only, first metamaterial 400a in a stack of metamaterials may be electronically tunable so as to be capable of selectively attenuating the passing of one or more than one sub-bands that each have a center wavelength 204 in subregion 601 (about 8 µm to about 9 µm), second metamaterial 400b in a stack may be electronically tunable so as to be capable of selectively attenuating the passing of one or more than one sub-bands that each have a center wavelength 204 in subregion 602 (about 9 µm to about 10 µm), third metamaterial 400c in a stack may be electronically tunable so as to be capable of selectively attenuating the passing of one or more than one sub-bands that have a center wavelength 204 in subregion 603 (about 10 µm to about 11 µm), and fourth metamaterial 400d in a stack may be electronically tunable so as to be capable of selectively attenuating the passing of one or more than one sub-bands that each have a center wavelength 204 in subregion 604 (about 11 µm to about 12 µm). In this exemplary embodiment then, the notch filter can be electronically tuned to attenuate the passing of one or more than one sub-bands, each sub-band having a notch center wavelength 204 anywhere in the selected spectral band of LWIR EMR (i.e., from about 8 µm to about 12 µm). In some embodiments, a metamaterial notch filter stack can be tuned so that the passing of two or more sub-bands of EMR can be selectively attenuated simultaneously. For example in FIG. 6, the passing of EMR in sub-bands 605 and 606 represented by notches in the figure may be simultaneously, selectively attenuated by electronically tuning metamaterial 400b to selectively attenuate passing of EMR in sub-band 605 in subregion 602 and electronically tuning metamaterial 400d to selectively attenuate passing of EMR in sub-band 606 in subregion 604.

In some aspects, one or more than one metamaterials in a stack of metamaterials may be tuned so as to sequentially position a notch center wavelength 204 from one side of a selected spectral band (e.g., for LWIR radiation at about 8 µm) to the opposite side of the selected spectral band (e.g., for LWIR radiation at about 12 µm). In some embodiments, a metamaterial in a tunable notch filter may be tuned so as to position notch center wavelength 204 at any location in a selected spectral band and in any order of positions in the selected spectral band.

In some embodiments, a tunable notch filter can be electronically tuned to selectively attenuate EMR having a selected polarization state. In some aspects, a metamaterial 400 comprising an array 401 of electrically connected graphene nanoantennas 402 that are nanoribbons can be tuned to selectively attenuate EMR having one or more selected polarization states. Similarly, one or more metamaterial notch filters in a plurality of metamaterial notch filters can be tuned differently, such that for example one or more metamaterial filters selectively attenuate EMR having a first selected polarization state and one or more different metamaterial filters selectively attenuate EMR having a second selected polarization state.

In some embodiments, a mapping spectrometer may also include one or more than one imaging optics. Some aspects may include for at least one time period in a plurality of selected time periods, directing EMR in a selected spectral band to a notch filter using at least one imaging optic. In some aspects, a method for analyzing EMR can comprise directing EMR in a selected spectral band with at least one imaging optic prior to the passing of the EMR to the detector array by the notch filter. In some aspects, at least one imaging optic may be used for directing EMR from an object or a scene to a tunable notch filter prior to the passing of EMR in a selected spectral band by the notch filter. In some aspects, EMR in a selected spectral band is directed by an imaging optic after the EMR is passed by the notch filter. In some embodiments, an objective lens, a photographic lens, a periscope, a waveguide, a focusing mirror, an integrated photonic circuit, field-flattening optics, telecentric optics, pericentric optics, a telescope, a microscope, or any combination of these may be useful as an imaging optic. In some embodiments, one or more than one imaging optics can be positioned to form a thermal image or an image of a scene at a focal plane of a detector array.

In some embodiments, spectral intensity information and spatial information about EMR that is incident on a notch filter and in a first set of one or more than one sub-bands can be computationally determined by subtracting a notched data array, representing a detector array response to EMR passed for a first selected time period, from a broadband data array that represents a detector array response to EMR passed for a second selected time period. In some embodiments, spectral intensity information and spatial information about EMR that is incident on a notch filter and in a first set of one or more than one sub-bands can be computationally determined by subtracting a first notched data array, representing a detector array response to EMR passed for a first selected time period, from a second notched data array, the second notched data array representing a detector array response to EMR passed by the notch filter when tuned to a different attenuating state for a second selected time period. By using the determined spectral intensity and spatial information about the EMR that is incident on the notch filter and in the first set of one or more than one sub-bands and received data arrays for each of a plurality of selected time periods, a spectral map of EMR in the selected spectral band that is incident on the notch filter for the plurality of selected time periods can be constructed.

In many embodiments, a notch 203 (representing the selectively attenuated passing of a sub-band of a selected spectral band) may have parameters (e.g., center wavelength 204, notch width 205, notch depth 206) that may be affected by the physics of a tunable notch filter. Accurate construction of a spectral map of EMR in a selected spectral band that is incident on a notch filter requires accounting for the notch parameters. In some aspects, for determining spectral intensity information about EMR that is incident on a notch filter and whose passing to a detector array is selectively attenuated, it is preferred to calibrate the notch filter by measuring the selective attenuation of EMR as a function of wavelength for all EMR passed by the notch filter for each selected time period.

Figure 7:
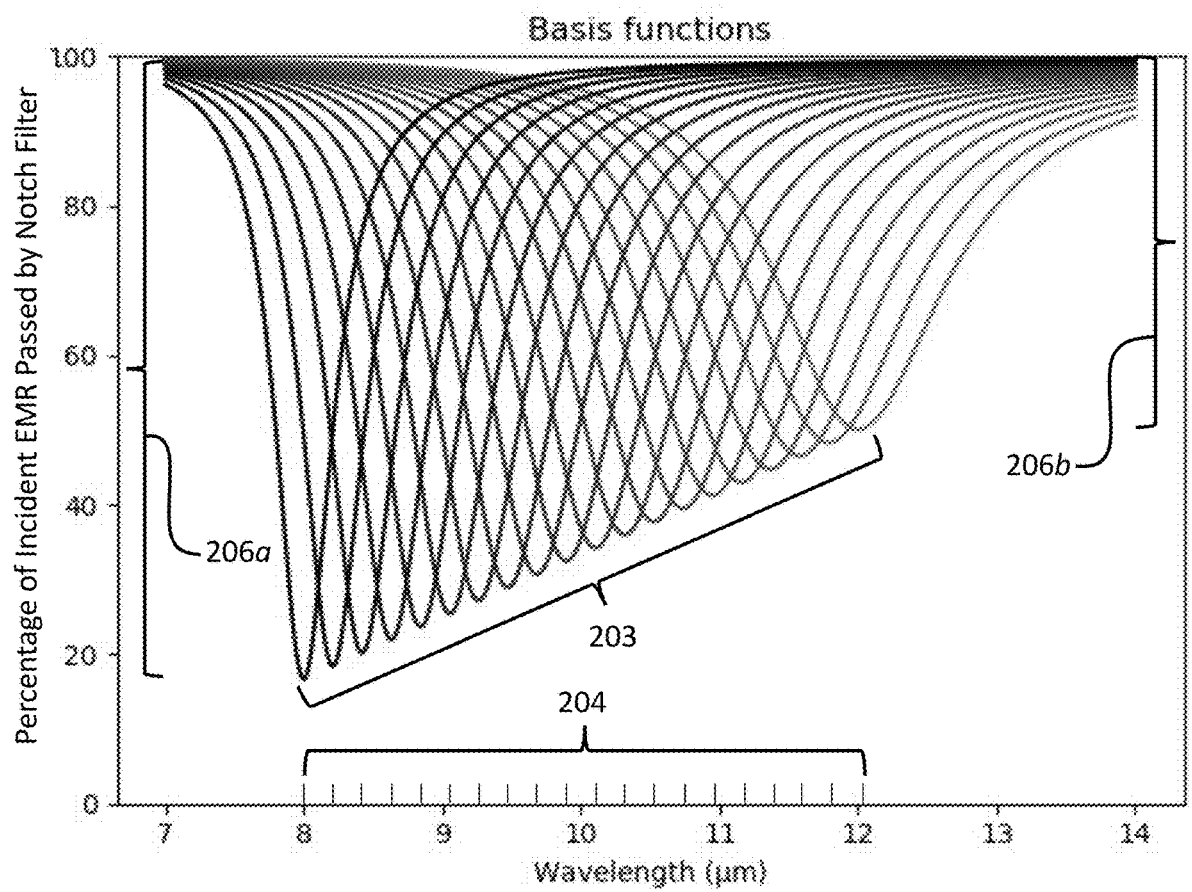
FIG. 7 shows the percentage of EMR that is incident on and passed by a notch filter that is tuned at each of 20 different states to pass selectively attenuated EMR. The set of twenty notches is designed to serve as a basis function set for calibration of a tunable notch filter.
Figures 8D, 8E, 8F:
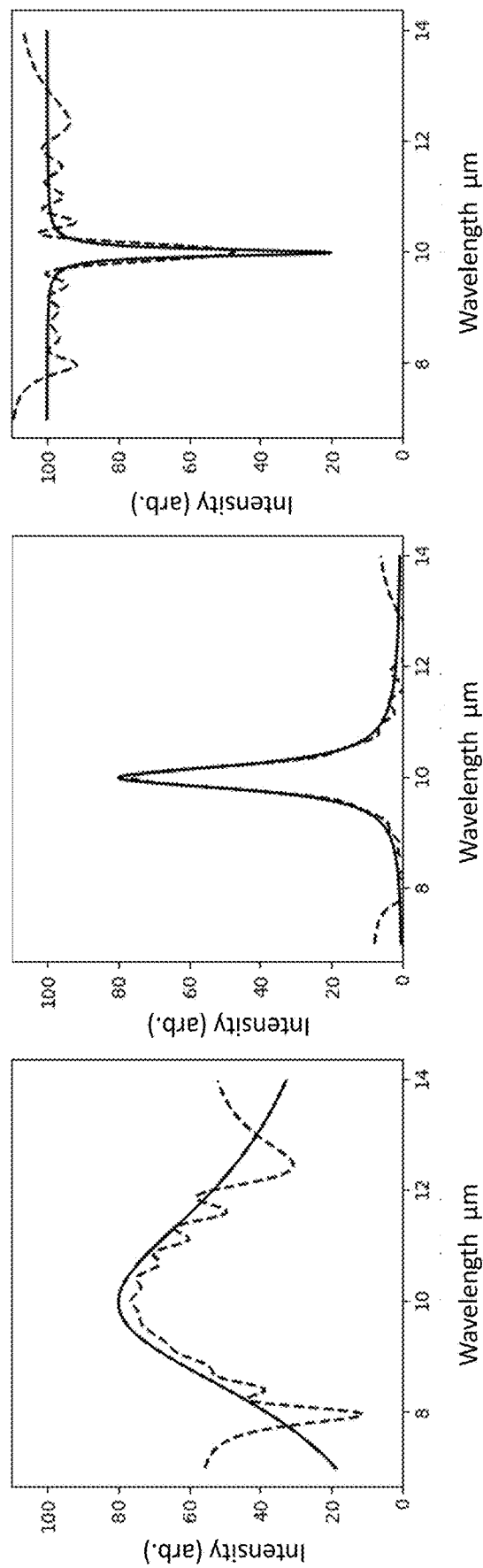

For computation, the wavelengths of EMR passed for each selected time period and the selected state of tuning of a notch filter for the respective time periods, are necessarily discretized into arrays for comparison. The discretized arrays are considered here with regard to calibration and determining spectral intensity information. For each notch filter tuning state, k, $1 \le k \le M$, there will be a measurement of the spectral intensity of the EMR passed by the notch filter, $c_k$, at each wavelength, $\lambda_l$, $1 \le l \le N$, which can be stored in matrix $\overline{\overline{T}} = T_{kl} = c_k(\lambda_l)$. An example of a calibration dataset (a set of basis functions) of 20 different Lorentzian notches is illustrated in FIG. 7. FIG. 7 shows the percentage of EMR that is incident on and passed by a notch filter that is tuned at each of 20 different states to pass selectively attenuated EMR. The set of 20 notches is designed to serve as a basis function set for calibration of a tunable notch filter. Here, the center wavelength 204 for each notch is positioned differently, i.e., at a different wavelength, as a result of the notch filter being tuned differently at each of twenty different states. The twenty notch center wavelengths span a selected spectral band of about 8 μm to about 12 μm. Each notch depth 206 indicates the percentage of incident EMR in a single sub-band of the selected spectral band passed by a notch filter for a selected time period. In this exemplary embodiment, each notch exhibits a different notch depth 206, a result of the phenomenology of the tunable metamaterial in this example. However, this is not requirement for a basis function set. For ease of viewing, notch depth 206 is labeled only for the notches at 8 μm 206a and 12 μm 206b.

For spectrum $\vec{S} = \{S(\lambda_1), \ldots, S(\lambda_N)\}$, a detector array will receive integrated intensity $x_k = \sum_{l=1}^{N} T_{kl} S(\lambda_l)$ for each notch filter tuning state k. However in some embodiments, because S is unknown, it can be challenging to compute the best estimate of $\vec{S}$ from spectral intensity measurements of passed EMR for each of the multiple notch filter tuning states. This can be described as the following minimization problem: $\vec{S} \sim \mathrm{argmin}_S \|\overline{\overline{T}} \vec{S} - \vec{x}\|$, where $\|\cdot\|$ represents a norm (typically the L2 Euclidean norm). A solution can be retrieved from this minimization problem by any of a variety of approaches. In some aspects, it may be preferred to retrieve a solution using the Moore-Penrose pseudoinverse. FIGS. 8A-8F show six examples of spectral intensity reconstruction using the Moore-Penrose pseudoinverse method and the basis function set of twenty notches shown in FIG. 7. The solid line in each graph represents a hypothetical intensity profile of EMR in the selected spectral band that is incident on a notch filter. The dashed line in each graph represents the reconstructed solution of the corresponding hypothetical spectral intensity profile of the EMR that is incident on the notch filter. It is to be noted that in some aspects, tuning a notch filter to selectively attenuate the passing of EMR in a narrower sub-band or sub-bands and/or increasing the number of notches in a set of basis functions can enhance the accuracy of reconstruction of a spectral intensity profile.

Several additional methods for retrieving a solution for the best estimate of $\vec{S}$ from spectral intensity measurements of EMR passed by the notch filter when the filter is tuned to different tuning states include regularized estimation, monte carlo methods, and gradient descent methods, to name a few.

Figure 9:
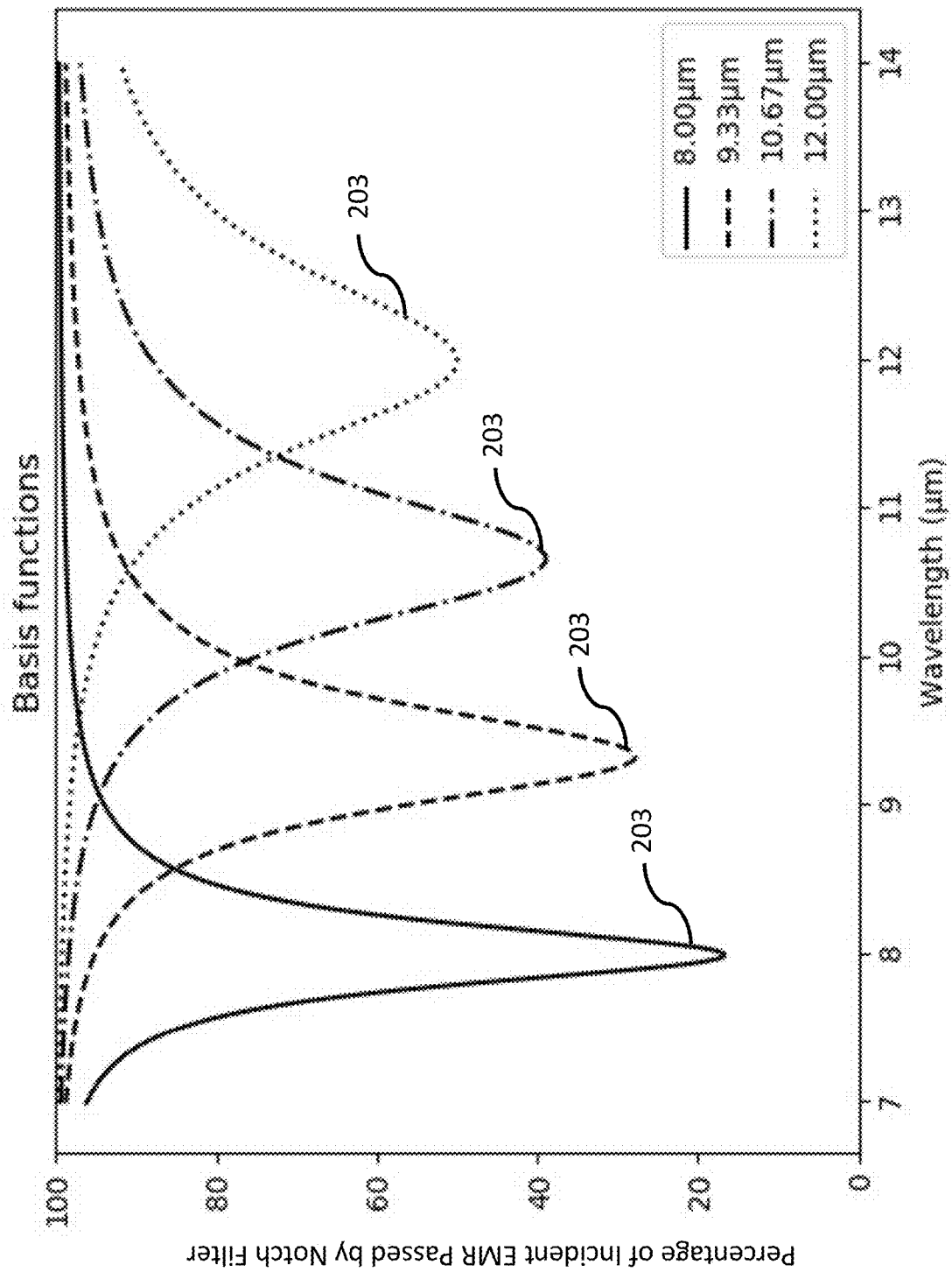
FIG. 9 shows the percentage of EMR that is incident on and passed by a notch filter that is tuned at each of four different states to pass selectively attenuated EMR. The set of four notches is designed to serve as a basis function set for calibration of a tunable notch filter.
Figures 10A, 10B, 10C:
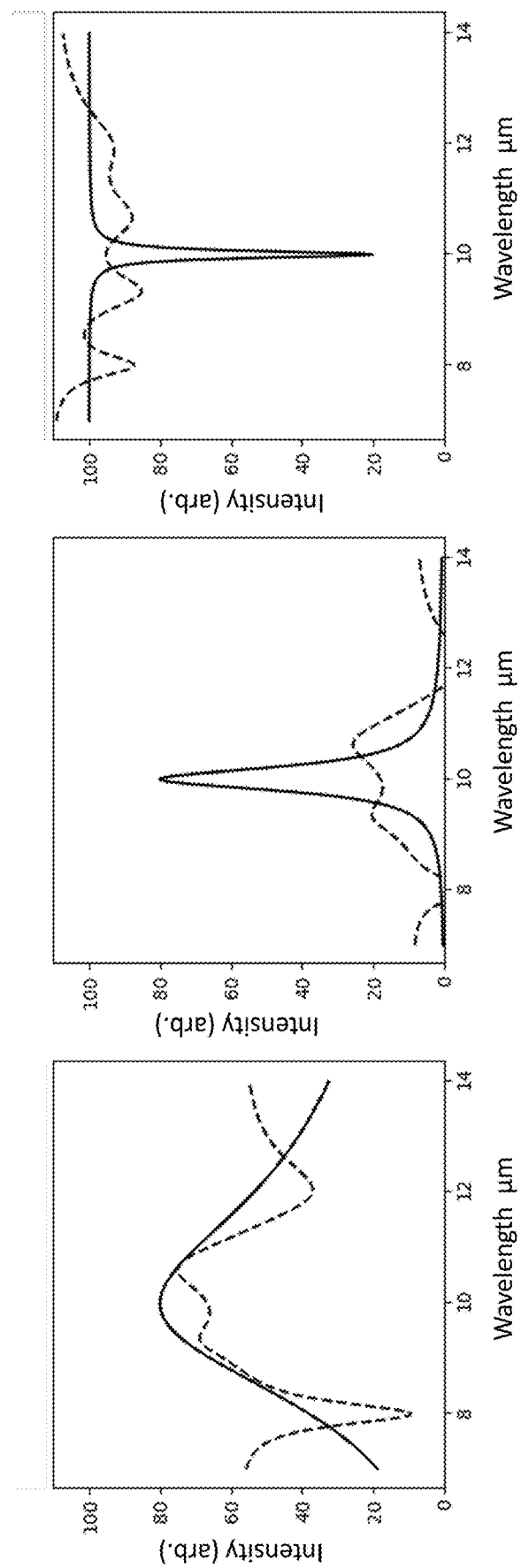
FIGS. 10A-10F show six examples of spectral intensity reconstruction using the Moore-Penrose pseudoinverse method and the basis function set of four notches shown in FIG. 9.
Figure 10F:
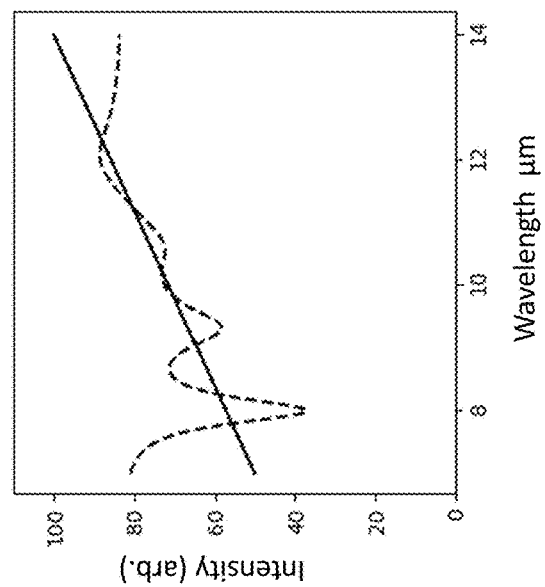
Figure 10E:
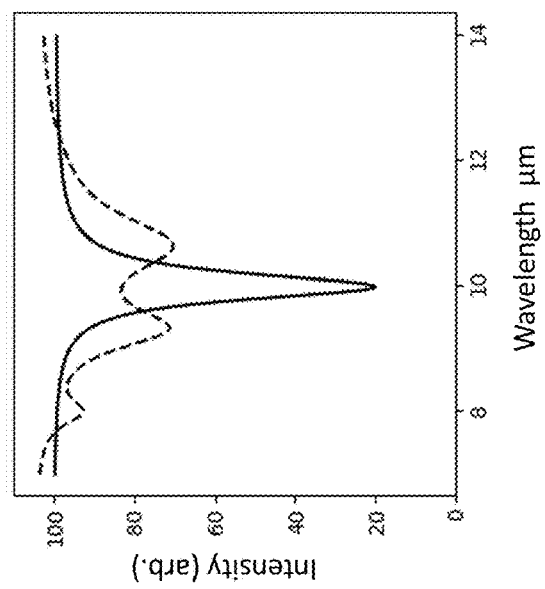
Figure 10D:
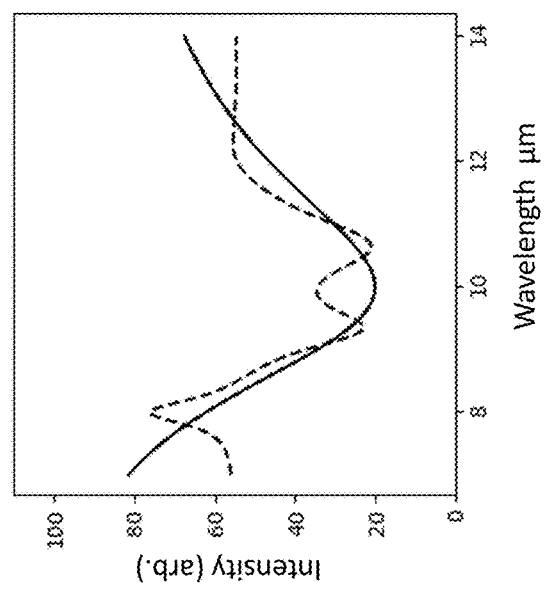

In some embodiments it may not be necessary to exhaustively evaluate a large number of notch filter tuning states, k, in the M notch filter tuning states to determine spectral intensity of EMR incident on a notch filter and in a selected spectral band. That is, a useful set of basis functions may have fewer notches. An example of a calibration dataset (a set of basis functions) of four different Lorentzian notches 203 is illustrated in FIG. 9. FIG. 9 shows the percentage of EMR that is incident on and passed by a notch filter that is tuned at each of four different states to pass selectively attenuated EMR. The set of four notches is designed to serve as a basis function set for calibration of a tunable notch filter. In this example the notch filter is tuned to position a Lorentzian notch to be at each of four different center wavelengths (8.00 μm, 9.33 μm, 10.67 μm and 12.00 μm) in a selected spectral band of about 8 μm to about 12 μm, i.e., the same selected spectral band as that shown in FIG. 7. FIGS. 10A-10F show six examples of spectral intensity reconstruction using the Moore-Penrose pseudoinverse method and the basis function set of four notches shown in FIG. 9. The solid line in each graph represents a hypothetical intensity profile of EMR incident on a notch filter. The dashed line in each graph represents the reconstructed solution of the corresponding hypothetical spectral intensity profile of the EMR in the selected spectral band that is incident on the notch filter. In this exemplary embodiment, the reconstructed solutions tend to exhibit a lower level of accuracy for the hypothetical intensity profiles of EMR solutions, but the method allows for a determination of broader spectral trends. In some embodiments, such as for example only, when reconstructing spectral intensity information about blackbody continuum EMR incident on a notch filter, a discretized array of reduced size can be adequate.

Figure 11:
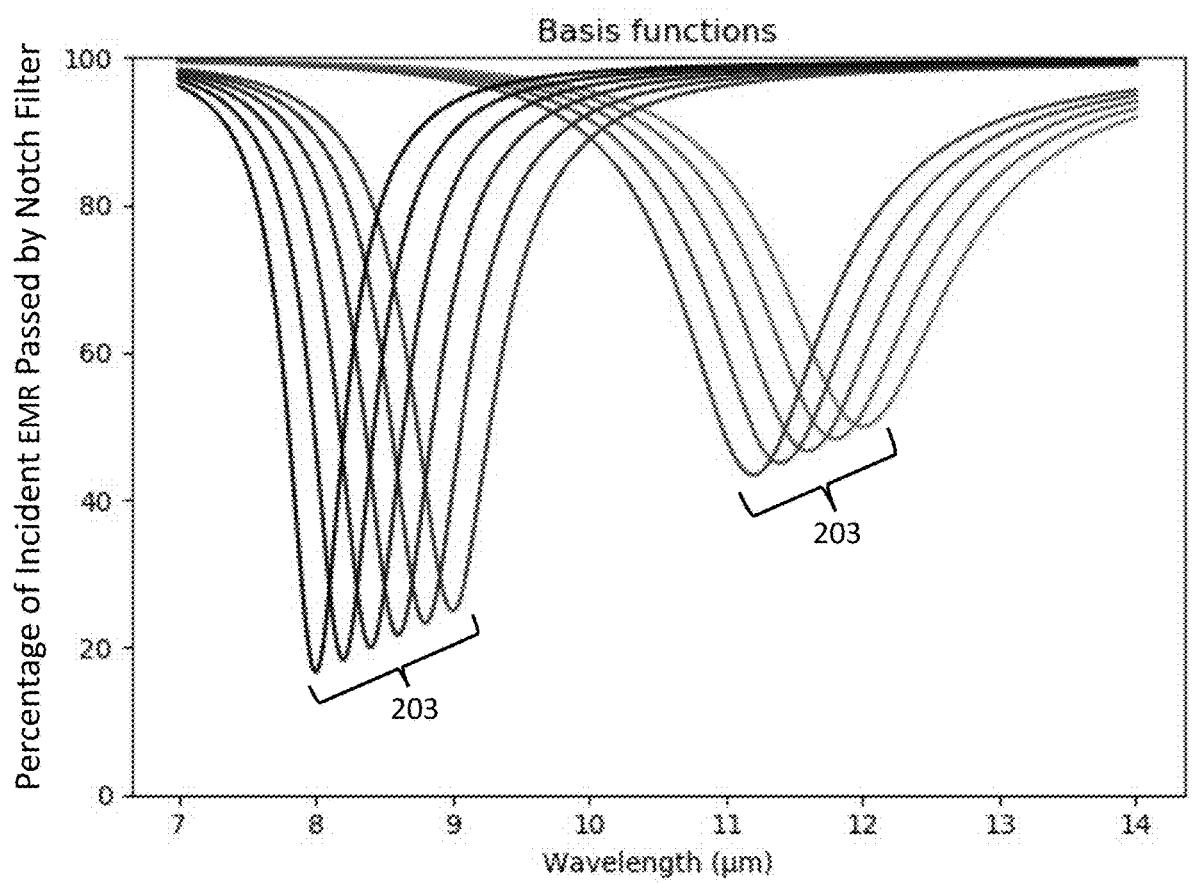
FIG. 11 shows the percentage of EMR that is incident on and passed by a notch filter that is tuned at each of ten different states to pass selectively attenuated EMR. The notches are positioned non-uniformly across a selected spectral band and are designed to serve as a basis function set for calibration of a tunable notch filter that provides increased spectral resolution within two different subregions of the selected spectral band.

In some aspects, such as for example only when more detailed spectral intensity information about a specific sub-band or sub-bands of incident EMR is desired, e.g., for detecting the presence of a specific spectral signature in a scene, a notch filter can be tuned to position notches more densely in and around a sub-band or sub-bands of interest. In some aspects, the position and parameters of different notches, as determined by the notch filter tuning state, need not be uniformly spaced across a selected spectral band or sub-band. For example, FIG. 11 shows the percentage of EMR that is incident on and passed by a notch filter that is tuned at each of ten different states to pass selectively attenuated EMR. The notches 203 are positioned non-uniformly across a selected spectral band and are designed to serve as a basis function set for calibration of a tunable notch filter that provides increased spectral resolution within two different subregions of the selected spectral band. In some embodiments, the Singular Value Decomposition (SVD) produces vectors that can be readily truncated to identify the minimal number of sub-bands or notches that can be evaluated to achieve a more general determination of spectral intensity information.

Some embodiments comprise, for each of a plurality of selected time periods, selectively attenuating the passing of EMR from an electronically tuned notch filter to a detector array, the selectively attenuated EMR being in a single sub-band in a selected spectral band that is incident on the notch filter. In some aspects, a notch filter is tuned so as to sequentially position notch center wavelength 204 from one side of a selected spectral band to the opposite side of the selected spectral band, and for each selected time period a data array representative of the electrical response of the detector array to incident EMR that is passed to the detector array is determined and received at a data processor. In this manner, a notched data array can be determined for each of the selected time periods, wherein the notch center wavelength 204 of the single notch is different for each selected time period. In some aspects, for each selected time period in the plurality of selected time periods notch center wavelength 204 can be selected to be any wavelength distance from notch center wavelength 204 selected for the previous time period.

In some embodiments then, a computational algorithm is used for determining spectral intensity and spatial information about the EMR in a single sub-band that is incident on the notch filter and whose passing is selectively attenuated for a selected time period. Computational processing can be used to construct a spectral map determined using a plurality of data arrays, wherein each data array corresponds to the radiance present in the one sub-band whose passing to the detector array was selectively attenuated for a selected time period. For example, a spectral map comprises a set of pixels corresponding to the determined spectral intensity at specific positions in space for a single sub-band, such as a two-dimensional image corresponding to the source of EMR from a scene. In some embodiments, a data array may have only one spatial dimension.

In some aspects, a useful algorithm for computationally comparing two or more data arrays may be based on linear algebra techniques. One exemplary useful algorithm is a transformation matrix. For a plurality of time periods in which EMR is passed to a detector array, a transformation matrix can be used to describe the relationship between a plurality of data arrays and a spectral map to be constructed. The matrix is inverted, and its inverse is used to construct a spectral map using the compared data arrays.

A spectral map may be constructed using information corresponding to the determined spectral intensity at specific points in space for a single sub-band of EMR, such as a two-dimensional image corresponding to the source of the EMR. In some aspects, a transformation matrix can be used to correlate a constructed spectral map with corresponding compared notched data arrays. In this manner, a two-dimensional matrix can be indexed spectrally by notch center wavelengths 204 of the selectively attenuated sub-bands of incident EMR in one dimension and spatially by the correspondence of selected detector array pixels with the source of the EMR.

If a spatial source of EMR that is being evaluated for spectral intensity and spatial information has no motion, the two-dimensional matrix will map all of the selected detector array pixels with the same correspondence to the physical source of the EMR, thereby keeping the matrix reasonably small and more easily invertible. For a given scan sequence, the matrix is inverted once, and its inverse used to compute the spectral map using the compared data arrays.

In some aspects, an EMR source or radiating scene that is being sampled for incident EMR for a plurality of selected time periods may be in motion or a spectral imager, including for example a notch filter and a detector array, may be in motion. Motion compensation algorithms can be used to minimize artifacts associated with relative motion of an EMR source and/or a spectral imager. A person having ordinary skill in the art of linear algebra algorithms and motion compensation would be able to identify useful computational techniques for use in minimizing relative motion artifacts.

In one exemplary embodiment for minimizing the effect of relative motion artifacts on a constructed spectral map, a plurality of notched data arrays and one or more broadband data arrays can be determined, each data array representing the response of a detector array to EMR that is passed by the notch filter for a selected time period in a plurality of selected time periods, wherein the time periods selected for passing of broadband EMR and the time periods selected for passing of selectively attenuated EMR are interspersed among one another. In some aspects, a time period selected for passing of broadband EMR may be nearly coincident with a time period selected for passing of selectively attenuated EMR, and comparison of the resulting notched data array and the resulting broadband data array may be useful for enhancing computational processing to determine spectral intensity information about the selectively attenuated EMR and for constructing a spectral map. In some aspects, comparing data arrays representative of a detector array response to EMR passed to the detector array for two nearly coincident time periods can serve to reduce spatial-spectral artifacts in a constructed spectral map that may be due to motion of the spectrometer or the source of EMR.

In some embodiments, employing relatively short time periods for the passing of EMR by a notch filter may be useful for minimizing the effect of relative motion artifacts on a constructed spectral map. By way of example, in some aspects, a notch filter may be tuned to rapidly switch a notch filter between a tuning state for the passing of broadband EMR and a tuning state for the passing of selectively attenuated EMR. In some embodiments, the length of time that includes a plurality of time periods may be on the order of milliseconds, such as for example about 1 millisecond or about 100 milliseconds or any length of time between about 1 millisecond and about 100 milliseconds or any length of time between about 10 milliseconds and about 100 milliseconds. In some aspects one or more than one of the time periods in a plurality of time periods may be on the order of milliseconds, such as for example any length of time between about 1 millisecond and about 100 milliseconds or any length of time between about 10 milliseconds and about 100 milliseconds.

In some embodiments other methods may be useful for reducing spatial-spectral artifacts that can be present in a constructed spectral map. For example a plurality of notched data arrays each being representative of the same scene can be interpolated to produce an estimated broadband data array that represents an estimated detector response to EMR passed for a time period that would be substantially coincident with a time period for which selectively attenuated EMR was passed to the detector array. Subtracting the corresponding notched data array from the estimated broadband data array can be useful for determining spectral intensity information about the selectively attenuated EMR.

In some aspects of a method, a plurality of notched data arrays may each be compared with a single broadband data array representative of the detector response to passed EMR for a single time period, wherein the single time period is selected to be within the range of time periods corresponding to those for which selectively attenuated EMR was passed to a detector array.

In another exemplary aspect, a broadband data array can be approximated using a sequence of notched data arrays with a weighted summation that accounts for the attenuated EMR in each data array. For example only, assume that EMR is passed for three selected time periods and for each time period passing of EMR in a single spectral band is selectively attenuated. The notch center wavelengths 204 for the three selected time periods are designated $\lambda_1$, $\lambda_2$, and $\lambda_3$, and span an entire selected spectral band of interest. The resulting data arrays $I_1$, $I_2$, and $I_3$ will each be notched at one of the three respective wavelengths. A broadband data array can be estimated by summing $I_1$, $I_2$, and $I_3$.

Detector arrays useful in embodiments of the invention may be in communication with at least one of a computing device, data processor, or other hardware and software useful for data analysis. Examples of data processors that may be useful in aspects of the invention include but are not limited to a microprocessor, microcontroller, field-programmable gate array (FPGA), graphics processing unit (GPU), or other processor that can be used for converting data arrays into spectral data for constructing a spectral map. A data processor may also comprise computer software for calibration and/or for executing algorithms for determination and for analysis of spectral and/or polarization components of EMR passed to a detector array or incident on a tunable notch filter.

In some embodiments, machine-executable instructions can be stored on an apparatus in a non-transitory computer-readable medium (e.g., machine-executable instructions, algorithms, software, computer code, computer programs, etc.) When executed by a data processor, instructions can cause the processor to receive detector response data, such as for example a data array representative of an electrical response of the detector to EMR, and to perform analysis of detector response data. In some aspects, the machine-executable instructions can cause the data processor to (a) receive an input of a detector response data array; (b) compare data arrays representative of the electrical response of a detector array to EMR passed for different selected time periods; (c) generate a spectral map from the assemblage of received data arrays; (d) determine information about EMR incident on the notch filter and whose passing by the notch filter to a detector array is attenuated; (e) determine information about EMR passed by the notch filter to the detector array; (f) construct a spectral map of EMR in a selected spectral band incident on the notch filter for a plurality of selected time periods (g) store data and information on a memory device that is communicatively coupled to the processor, (h) transfer instructions for tuning the notch filter to the electronic controller, or to perform any combination of these actions.

Computing devices, components, and computer media that may be useful in embodiments described herein include for example a computer, storage device, communication interface, a bus, buffer, and data or image processors that are configured to perform calibration of a detector array or to receive, store, or process measurements that result from EMR illuminating pixels on a detector array and information determined by analysis of data arrays. In some embodiments, calibration, spectral component determination, implementing an algorithm, or analysis of spectral and polarization components of EMR or any combination of these may be implemented on a tangible computer-readable medium comprising computer-readable code that, when executed by a computer, causes the computer to perform one or more than one operations useful in embodiments described herein. A processor or processors can be used in performance of the operations driven by the tangible, computer-readable media. In some embodiments, tangible computer-readable media may be, for example, a CD-ROM, a DVD-ROM, a flash drive, a hard drive, system memory, a non-volatile memory device, or any other physical storage device. or any combination of these. Alternatively, the processor or processors can perform those operations under hardware control, or under a combination of hardware and software control. In some embodiments of the invention, data resulting from measurements of a detector array response to passed EMR may be transferred to a storage device for processing at a later time or transferred to another computer system on demand via a communication interface.

In some embodiments, a monitor may be communicatively coupled to the processor and memory device to display input information and/or spectral map information. In some embodiments, instructions stored on the non-transitory machine-readable medium further encode a user interface that provides a graphical display on a monitor. The interface can allow a user to enter parameter information regarding for example notch filter tuning and detector array electrical response (e.g., by allowing the user to upload a data file or by allowing the user to enter information into display fields shown on the user interface). In some embodiments, the user interface provides the user with options for analyzing the parameter information, such as various methods for displaying and/or saving the input data and/or detector response data (e.g., by displaying the data on the user's monitor, sending the data to a specified electronic device or electronic address, printing, or saving the data to a particular location). In various embodiments, detector array responses, notch filter tuning information, data arrays, and spectral maps or any combination of these may be stored as data in a non-transitory storage medium physically connected to the detector (e.g., on an internal memory device such as a hard drive on a computer) and/or stored on a remote storage device that is communicatively connected to a detector array (e.g., by a wired or wireless intranet or internet connection and the like). In some embodiments, the user interface provides the user with options for automatically storing the data in a particular location, printing the data, and sending the data to a specified electronic device or electronic address.

Upon reading this disclosure, a person having ordinary skill in the art will be able to understand that the novel methods described herein that use an electronically tunable notch filter in spectral and hyperspectral mapping provide significant advantages for analyzing EMR in a variety of different settings. Embodiments of the invention can be useful for identifying materials and for revealing electronic or vibrational transitions in a material. Some material when excited by lasers may exhibit Raman emission modes and chemically unique spectroscopic signatures that can be determined and mapped using methods described herein to determine a material's composition and/or microstructure. In some aspects, by comparing a spectral map or data array determined using methods described herein with spectra from a database or a spectral model, it is possible to identify at least one of a chemical, mineral, or biological species, and a method may include identifying at least one of a mineral, a biological, or a chemical species. In some aspects, useful methods for comparing spectra include matched filters and correlation analysis. In addition, the use of spatial sensitivity and spatial mapping can provide additional information that can be exploited for the identification of structures. By way of example only, camouflaging may affect perception or appearance of a structure or scene such that it visually appears to be identical to a different structure or scene of an environment. However, when embodiments of the invention are used to determine the spectral signature of the camouflaged structure or region, the signature is unique and identifiable as being different from the item or region it was intended to resemble or mimic. Furthermore, the spatial extent of the camouflage can be determined from the spectral map. In another exemplary embodiment a pair of spectral maps may be used to form a spectrally resolved disparity map, which can increase the accuracy of passive computer stereo vision relative to intensity disparity maps.

What is claimed is:

1. A method for analyzing electromagnetic radiation, the method comprising:
    for a plurality of selected time periods, passing electromagnetic radiation from an electronically tuned notch filter to a detector array, the electromagnetic radiation being incident on the notch filter and in a selected spectral band, and wherein the notch filter is tuned differently for each of the plurality of selected time periods and the electromagnetic radiation is passed by the notch filter;
    for at least a first selected time period in the plurality of selected time periods, selectively attenuating the passing of electromagnetic radiation that is incident on the notch filter and in a first set of one or more than one sub-bands in the selected spectral band;
    for each of the plurality of selected time periods, determining an electrical response of the detector array to the passed electromagnetic radiation and receiving at a data processor a data array representative of the determined electrical response of the detector array to the passed electromagnetic radiation;
    computationally comparing two or more of the received data arrays, the two or more compared data arrays including the data array representative of the determined electrical response of the detector array to the electromagnetic radiation passed for the first selected time period;
    determining from the two or more compared data arrays, spectral intensity information and spatial information about the electromagnetic radiation that is incident on the notch filter and in the first set of one or more than one sub-bands;
    using the received data arrays for each of the plurality of selected time periods and the determined information about the electromagnetic radiation that is incident on the notch filter and in the first set of one or more than one sub-bands, constructing a spectral map of electromagnetic radiation in the selected spectral band that is incident on the notch filter for the plurality of selected time periods.

2. The method of claim 1, wherein the notch filter is integrated with the detector array.

3. The method of claim 1, wherein the notch filter is operated in a reflection mode for passing of the electromagnetic radiation incident on the notch filter and in the selected spectral band.

4. The method of claim 1, wherein the notch filter is operated in a transmission mode for passing of the electromagnetic radiation incident on the notch filter and in the selected spectral band.

5. The method of claim 1, wherein the first set of one or more than one sub-bands comprises a plurality of sub-bands.

6. The method of claim 1 further comprising;
    for at least a second selected time period in the plurality of selected time periods, passing the electromagnetic radiation incident on the notch filter and in the selected spectral band to the detector array without selectively attenuating the passing of the incident electromagnetic radiation in the selected spectral band, and wherein the two or more compared data arrays include the data array representative of the determined electrical response of the detector array to the electromagnetic radiation passed for the second selected time period.

7. The method of claim 1 further comprising;

for at least a second selected time period in the plurality of selected time periods, selectively attenuating the passing of electromagnetic radiation that is incident on the notch filter and in a second set of one or more than one sub-bands in the selected spectral band, and wherein the two or more compared data arrays include the data array representative of the determined electrical response of the detector array to the electromagnetic radiation passed for the second selected time period.

8. The method of claim 7 further comprising:

determining from the two or more compared data arrays, spectral intensity information and spatial information about the electromagnetic radiation that is incident on the notch filter and in the second set of one or more than one sub-bands of the selected spectral band; and using the received data arrays for each selected time period and the determined information about the electromagnetic radiation that is incident on the notch filter and in the first set and second set of one or more than one sub-bands in the selected spectral band, constructing a spectral map of the electromagnetic radiation in the selected spectral band incident on the notch filter for the plurality of selected time periods.

9. The method of claim 7, wherein for the second selected time period in the plurality of selected time periods, the notch filter is electronically tuned based on the determined information about the electromagnetic radiation that is incident on the notch filter and in the first set of one or more than one sub-bands.

10. The method of claim 7, further comprising:

selectively attenuating the passing of a selected sub-band in the first set of one or more than one sub-bands to a different extent than the passing of a selected sub-band in the second set of one or more than one sub-bands, and wherein the selected sub-band in the first set of one or more than one sub-bands and the selected sub-band in the second set of one or more than one sub-bands are overlapping sub-bands.

11. The method of claim 7, wherein at least one sub-band from one or both of the first set of one or more sub-bands and the second set of one or more sub-bands is not common to both the first set and the second set of one or more sub-bands.

12. The method of claim 1, further comprising selectively attenuating at least one sub-band in the first set of one or more than one sub-bands, the at-least one sub-band having a selected polarization state;

determining polarimetric information about the at-least one sub-band having the selected polarization state; and, using the polarimetric information in constructing the spectral map.

13. The method of claim 1, wherein the notch filter is tuned for selectively attenuating the passing of electromagnetic radiation that is incident on the notch filter and in the first set of one or more than one sub-bands regardless of the polarization state of the electromagnetic radiation in the first set of one or more than one sub-bands.

14. The method of claim 1, further comprising:

for at least one time period in the plurality of selected time periods, directing electromagnetic radiation in the selected spectral band to the notch filter with an imaging optic.

15. The method of claim 1, further comprising:

for at least one time period in the plurality of selected time periods, after passing the electromagnetic radiation incident on the notch filter and in the selected spectral band, directing the passed electromagnetic radiation with an imaging optic.

16. The method of claim 1, further comprising:

identifying a mineral, a biological, or a chemical species.

17. The method of claim 1, wherein the detector array and the data processor are integrated and wherein the computationally comparing is executed by the data processor.

18. The method of claim 1, wherein the notch filter comprises one or more than one metamaterials, each metamaterial being separately and electronically tunable, and wherein the notch filter is electronically tuned by electronically tuning the one or more than one metamaterials.

19. The method of claim 18, wherein the notch filter comprises a plurality of metamaterials.

20. The method of claim 18, wherein the one or more than one metamaterials comprise graphene.

21. The method of claim 20, wherein the graphene in each of the one or more than one metamaterials is patterned into an array of electrically connected nanoantennas.

22. The method of claim 18, wherein the selected spectral band is from about 0.4 µm to about 15 µm.

23. The method of claim 22, wherein the selected spectral band is from about 3 µm to about 5 µm.

24. The method of claim 23, wherein the selected spectral band is from about 8 µm to about 12 µm.

* * * * *